Nov. 10, 1959 DAVID SHOU-I NEE 2,912,162

SQUARE ROOT EXTRACTING CIRCUIT ARRANGEMENTS

Filed Sept. 16, 1958 8 Sheets-Sheet 1

INVENTOR.

David Shou-i Nee

BY

Samuel E. Turner

AGENT

Nov. 10, 1959 DAVID SHOU-I NEE 2,912,162

SQUARE ROOT EXTRACTING CIRCUIT ARRANGEMENTS

Filed Sept. 16, 1958 8 Sheets-Sheet 2

Nov. 10, 1959 DAVID SHOU-I NEE 2,912,162

SQUARE ROOT EXTRACTING CIRCUIT ARRANGEMENTS

Filed Sept. 16, 1958 8 Sheets-Sheet 3

Nov. 10, 1959 DAVID SHOU-I NEE 2,912,162

SQUARE ROOT EXTRACTING CIRCUIT ARRANGEMENTS

Filed Sept. 16, 1958 8 Sheets-Sheet 5

Nov. 10, 1959 DAVID SHOU-I NEE 2,912,162

SQUARE ROOT EXTRACTING CIRCUIT ARRANGEMENTS

Filed Sept. 16, 1958

8 Sheets-Sheet 6

United States Patent Office

2,912,162

Patented Nov. 10, 1959

2,912,162

SQUARE ROOT EXTRACTING CIRCUIT ARRANGEMENTS

David Shou-i Nee, Palo Alto, Calif., assignor to Smith-Corona Marchant Inc., a corporation of New York

Application September 16, 1958, Serial No. 761,317

8 Claims. (Cl. 235—158)

The invention relates to computers, and more particularly, to methods and apparatus for extracting square roots of binary numbers.

A computer for performing a single arithmetic operation is rarely desirable. Thus, comuters are comprised generally of several arithmetic circuits so that many arithmetic operations can be performed. Because of this desired combination of circuits and because of the complexity of each circuit, computers are necessarily intricate and expensive devices. Therefore, combining arithmetic circuits so that as many parts as possible are common to each circuit eliminates duplication of components, thereby reducing the cost and simplifying the circuitry of a computer. The square root circuit of the invention utilizes magnetic disk recirculation memory registers of the type disclosed in a copending U.S. patent application by Donald F. White et al., Serial Number 413,388, filed March 1, 1954. An arithmetic circuit for performing addition, subtraction, and multiplication and utilizing magnetic disk recirculation memory registers of the type disclosed in the White application is disclosed in a copending U.S. patent application by George B. Greene, Serial Number 562,272, filed January 30, 1956. Thus, the square root circuit of the invention may be combined with Greene's device and other arithmetic circuits utilizing magnetic disk recirculation memory registers in such a manner that the circuits use common memories, thereby acquiring the advantages of simplified circuitry and reduced cost.

An object of the invention is to provide an improved arithmetic unit.

Another object is the calculation of square roots of binary numbers.

Another object of the invention is calculation of the square root of a binary number according to a method based on the system of subtracting successive odd numbers.

Still another object of the invention is the provision of a system for calculating the square root of a binary number wherein operational data representations and a radicand representation are stored by magnetic recording of pulses on register areas of rotating magnetic disks.

An additional object is the provision of a binary square root circuit utilizing magnetic disk recirculation memory registers that may be used in common in other arithmetic circuits.

The invention comprises a device for calculating the square root of a binary number according to a method based on the system of subtracting successive odd numbers.

The method comprises the following steps: (1) entering a representation of a radicand into a radicand register; (2) entering representations of operational data into a subtractor register, an additive subtractor modifier register, and a subtractive subtractor modifier register; (3) executing a routine cycle whereby the representations of the radicand and the operational data as contained in the respective registers interact by means of associated circuitry to produce a representation of the highest order of the root of the radicand and to enter the root representation into a root register; and (4) repeating routine cycles sequentially to obtain a representation of the next lower order digit of the root for each cycle until the capacity of the registers is reached.

In one embodiment there are five recirculation memory registers including three operational registers, a radicand register, a root register, and associated circuitry. Representations of operational data and a radicand are entered into the appropriate registers. This data is recirculated in the registers until acted upon by the associated circuitry. The action of the associated circuitry and registers causes the data to interact, according to the methods described above, to produce a root representation of the radicand and to enter the representation into the root register for recirculation until it is desired to read out the information.

In an alternate embodiment, the root register is omitted, the root being developed only in the subtractor register (the preferred embodiment develops the root in both the root and subtractor registers). Also, an adder and adder-subtractor circuit is substituted for corresponding parts of the preferred embodiment. Otherwise, the circuitry and the method of obtaining the root are similar to the first embodiment.

Two embodiments of the invention given by way of example are descrbied hereinafter with reference to the accompanying drawing in which:

Fig. 1 (sections 1(*a*) and 1(*b*) taken together) is a schematic diagram of one embodiment of the invention;

Fig. 2 (sections 2(*a*) and 2(*b*) being taken together) is a schematic diagram of a second embodiment;

Fig. 3 (sections 3(*a*), 3(*b*) and 3(*c*) being taken together) is a diagram showing the time relationship between the commutators and disks of the first embodiment;

Before presenting a detailed description of the operation of the embodiments of the invention, various circuit elements which are employed in the invention will be described.

CIRCUIT ELEMENTS

*Reciprocircuits*

As employed herein, the term "reciprocircuit" is construed to include all circuits having two distinguishable states of operation. The term "bistable reciprocircuit" denotes a reciprocircuit having two input terminals each of which corresponds to one of the two stable states of operation so that a first triggering pulse applied at one terminal and then, successively, a second triggering pulse applied at the other terminal causes the circuit to complete a cycle of operation. The term "dual reciprocircuit" denotes a reciprocircuit having three input terminals two of which correspond to the two stable states of operation as in the case of a bistable reciprocircuit. A pulse applied to the third terminal causes the circuit to change to its alternate stable state of operation so that two successive pulses applied to the third terminal cause the circuit to complete a cycle of operation.

In one form, a reciprocircuit comprises a pair of triode vacuum tubes having a bias arrangement common to both tubes, and having grid-to-anode resistive cross-coupling.

The principal advantage of a reciprocircuit derives from the fact that the circuit has two stage states of equilibrium, e.g., in a vacuum tube reciprocircuit, when either tube is conducting, the other tube is cut off, and the output is inherently bistable, i.e., having two discrete levels or two polarities. The circuit may be caused to change abruptly from one stable state to the other by the application of proper control or triggering potentials to one or more electrodes. In each state of circuit equilibrium, there is a respective stable set of circuit currents. Therefore, in a vacuum tube reciprocircuit, there are two possible potential levels at the anode of each tube, namely a relatively low potential when the tube is conducting and a relatively high potential when the tube is cut off. In a saturable core type of reciprocircuit the potentials are substantially equal, but distinguishable in polarity.

An example of a reciprocircuit is the well-known Eccles-Jordan vacuum tube trigger circuit, described by H. J. Reich at pages 353 through 356 of Theory and Application of Electron Tubes, published by McGraw-Hill. New York.

Figure 8:
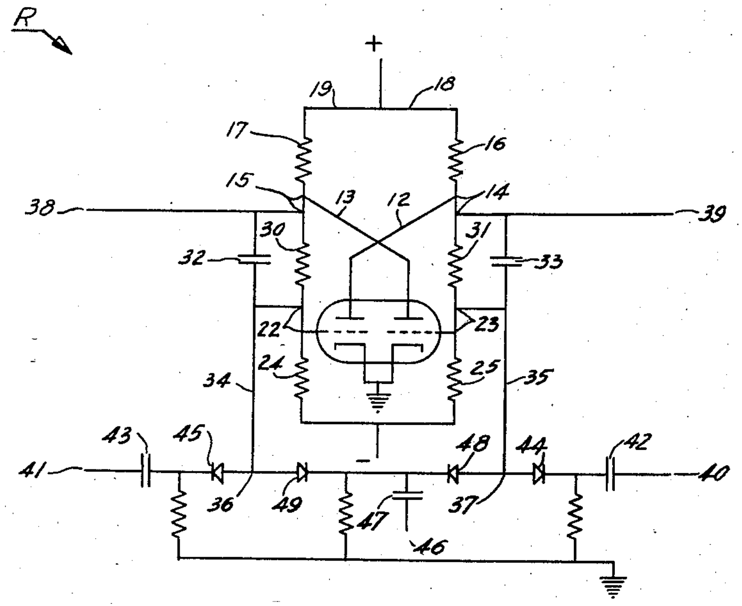
Fig. 8 is a schematic diagram of a dual reciprocircuit used in both embodiments.

A modified Eccles-Jordan trigger circuit, R, as employed in the described embodiment of the invention, is shown in Fig. 8, and is hereinafter referred to as a "dual reciprocircuit." This circuit R also operates in the manner of a bistable reciprocircuit if one terminal 46 is left idle. Therefore, the circuit R may be used for the operations referred to hereinafter requiring a bistable reciprocircuit. Since the dual reciprocircuit is a two-state device and is used where it is significant that the dual reciprocircuit is in a particular one of its states, it is convenient to distingush the two stable states of the circuit. Thus, when a tube 10 or 11 is conducting, the respective conditions may be given labels for convenience in following circuit operation. In binary computer applications it is convenient to indicate "naught" and "unit" condition. In addition, the input terminal to which a pulse must be applied to cause the circuit to assume a particular condition may be given a label corresponding to the condition. For example, the "naught input terminal" is the terminal to which a pulse is applied to cause a binary computing circuit to assume its naught condition. Likewise, an output terminal may be given a label corresponding to the condition of the circuit which causes the output terminal to assume a significant voltage (usually, but not necessarily, the higher voltage). Thus, when the tube 10 of the circuit R conducts, the circuit is in its naught condition, the terminal 40 is the naught input terminal and terminal 38 is the naught output terminal. Likewise, when the tube 11 conducts, the circuit is in its unit condition, the terminal 41 is the unit input terminal and terminal 39 is the unit output terminal.

The anode of the tube 10 is connected by a lead 12, a junction 14, a resistor 16, and a lead 18 to a source of positive energizing potential. Similarly, the anode of the tube 11 is connected by a lead 13, a junction 15, a resistor 17, and a lead 19 to a positive energizing potential. The cathodes of each tube are connected by a common cathode lead 20 to a point of fixed reference potential, shown as ground.

The grid of the tube 10, hereinafter designated the "naught grid," is connected through a junction 22 and a resistor 24 to a source of negative potential. The grid of the tube 11, hereinafter designated the "unit grid," is similarly connected through a junction 23, and a resistor 25 to a negative potential. The naught grid is also connected through the junction 22, a resistor 30 in parallel with a capacitor 32, the junction 15, and the lead 13, to the anode of the tube 11. The unit grid is similarly connected through the junction 23, a resistor 31 in parallel with a capacitor 33, the junction 14, and the lead 12 to the anode of the tube 10.

The unit input terminal 41 is connected through a capacitor 43, a diode 45, a junction 36, a lead 34 and junction 22 to the naught grid. Likewise, naught input terminal 40 is connected through a capacitor 42, a diode 44, a junction 37, a lead 35 and the junction 23 to the unit grid. A symmetrical input terminal 46 is connected to both the naught and unit grids through a capacitor 47, a pair of diodes 49 and 48, the junctions 36 and 37, and the junctions 22 and 23, respectively.

If a negative pulse is applied to the symmetrical input terminal 46, it causes the circuit to change from one state of equilibrium to the other. Assuming that the naught side is initially conducting, a negative pulse applied to the terminal 46 is transmitted through the diode 48 to the unit grid, but since the unit side is already cut off, the pulse has no effect on the tube 11. However, the same negative pulse is transmitted through the diode 49 to the naught grid causing a decrease in the potential at the naught grid, and thereby causing the conduction of the naught side to decrease. Consequently, the potential at the junction 14 rises, and this rise in potential is coupled by the capacitor 33 and the resistor 31 to the unit grid to initiate conduction in the unit side. The conduction of the unit side lowers the potential at the junction 15. This fall in potential is coupled by the capacitor 32 and the resistor 30 to the naught grid, thereby lowering the naught grid potential and further reducing the conduction of the naught side. Conduction increases in the unit side and decreases in the naught side until a state of equilibrium is reached with the unit side fully conducting and the naught side cut off. Each subsequent negative pulse applied to the terminal 46 similarly reverses conduction from one side to the other.

A negative pulse applied to the unit terminal 41 places the circuit in its unit condition if it is conducting on the naught side, but has no effect if the circuit is already in its unit condition. Assuming that the circuit is in its naught condition, a negative pulse applied to the terminal 41 is coupled by the capacitor 43, the diode 45, and the lead 34 to the naught grid. The diode 49 blocks this pulse from the unit grid. The negative pulse on the naught grid causes conduction to reverse from the naught side to the unit side in the manner hereinbefore described. Similarly, a negative pulse applied to the naught terminal 40, places the circuit in its naught condition if the circuit is in its unit condition, but has no effect on the circuit if it is already in its naught condition.

The dual reciprocircuit is adapted to control other devices, such as a gating circuit, by the changing potential levels at the junctions 14 and 15. When the circuit is in its naught condition, the potential at the junction 15 is relatively high, and the potential at the junction 14 is relatively low; the converse is true when the circuit is in its unit condition. These potentials are available at the naught and unit output terminals 38 and 39, which are connected to the junctions 15 and 14, respectively.

Figure 9:
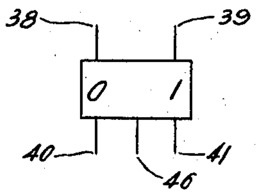
Fig. 9 is a block diagram of the circuit of Fig. 8.

A block representation of the circuit R is shown in Fig. 9 as a rectangle. The symmetrical input terminal 46 is at the bottom center of the rectangle and the naught and unit input terminals 40 and 41 are at the bottom left and bottom right of the rectangle, respectively. The naught and unit output terminals 38 and 39 are shown at the top left and top right of the rectangle, respectively.

While a vacuum tube circuit has been shown, it is to be understood that other forms of reciprocircuits can be employed. For example, ferro-resonant or transistor trigger circuits.

*Recirculation memory*

Figure 4:
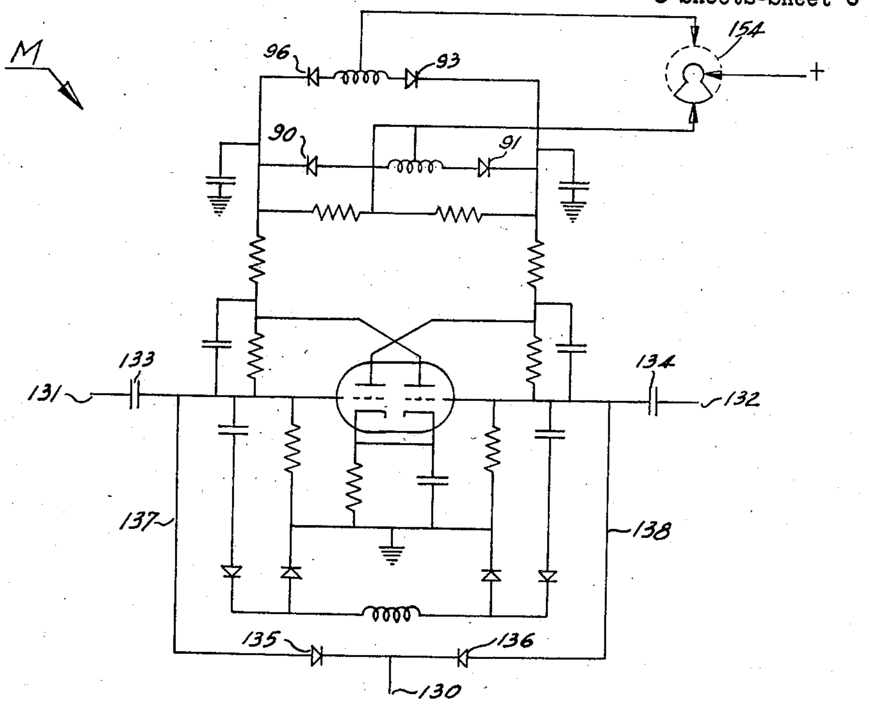
Fig. 4 is a schematic diagram of a dual reciprocircuit used in a magnetic disk recirculation memory register.

A fifth element employed in the invention is a magnetic disk recirculation memory register of the type disclosed by White and Reinholtz in a copending U.S. patent application, Serial No. 413,388 filed 1 March 1954. Briefly, a recirculation memory register of this type comprises a bistable reciprocircuit which receives binary signals from a magnetic reading transducer and transmits these signals to a magnetic writing transducer where they are rewritten. To adapt the recirculation memory register for use in the present invention, symmetrical and asymmetrical inputs and a shifting writing transducer are added to the circuit. Fig. 4 shows a complete circuit M with the necessary additions: a pair of asymmetrical input terminals 131 and 132 with respective coupling capacitors 133 and 134; a symmetrical input terminal 130; a pair of diodes 135 and 136 to mutually isolate the grids and to limit symmetrical response of the circuit to negative pulses applied to the terminal 130; a pair of leads 137 and 138 connecting the diodes 135 and 136 to the grids; a shifting writing transducer 85; and a network of blocking diodes 90, 91, 92, and 93.

Illustrated in Fig. 5, a recirculation memory as embodied in the invention comprises a magnetic medium in the form of two diametrically positioned groups of magnetizable segments 141 and 149, hereinafter called "islands," embedded along the periphery of a disk 140 which is constructed preferably of nonmagnetic material. A reading transducer 80 includes a core 143 having a gap 144 disposed in cooperative relation with the disk 140. A winding 145 on the core 143 is connected by a pair of leads 166 and 126 to the naught and unit input terminal respectively, of a dual reciprocircuit 150 which can be of the type shown in Fig. 4. A non-shifting writing transducer 83 includes a core 146 having a gap 147 disposed in cooperative relation with the disk 140. A center-tapped winding 148 on the core 146 is connected by a pair of leads 89 and 99 to the naught and unit output terminals respectively, of circuit 150. A shifting writing transducer 85 includes a core 151 having a gap 152 disposed in cooperative relation with the disk 140. A center-tapped winding 153 on the core 151 is connected by a pair of leads 87 and 97 to the naught and unit output terminals respectively of circuit 150.

Each magnetic island of the groups 141 and 149 may represent or store a binary digit. If an island is magnetized in a given direction it represents a unit; if magnetized in the opposite direction it represents a naught. Thus, each group of magnetic islands 141 or 149 can store a binary number or "word." For simplicity of illustration, only seven islands are shown in each group, although it is to be understood that in practice a greater number of islands may be used. For example, satisfactory results have been attained using as many as thirty-five islands in each group on a disk six inches in diameter.

When a magnetic island is sensed or read by the reading transducer 80, the circuit 150 assumes a corresponding state of operation which causes the writing transducer to rewrite the representation of the sensed binary digit as fully described in the above-mentioned application.

It should be noted that in the circuit shown in Fig. 4 only one writing transducer at a time has a positive potential applied to its center tap through a commutator 154. Thus, one or the other of the writing transducers is selected to record the magnetic representations.

The transducer 83 is designated as the non-shifting writing transducer since it magnetizes an island of the group currently passing through its gap which corresponds to the island of the other group that last energized the transducer 80. The transducer 85 (Fig. 5) is designated as the shifting transducer since it is positioned to magnetize an island of one group which is ordinally higher or lower than the island of that group which corresponds to the island of the other group currently passing adjacent the reading transducer 80. The transducer 85 can be positioned from the transducer 83 any number of integral lengths of the arc between leading edges of adjacent islands of a group. Thus, a word is shifted by placing the transducer 85 in the desired position and removing the potential at the center tap of the transducer 83 and applying it to the center tap of the transducer 85. Therefore, as the disk 140 rotates, all of the digits of a word contained in one group of islands are sequentially read by the reading transducer 80; and through the action of the circuit 150, a word is rewritten by the writing transducer 83 or 85 into the appropriate islands of the opposite group. Thus, each group 141 and 149 normally contains the same binary word, and as this word is recirculated from one group to the other it can be modified or shifted.

New information can be entered into the recirculation memory through the input terminal 131 to the naught side, or through the input terminal 132 to the unit side of the circuit 150. A positive pulse applied to the naught input terminal 131 causes the naught side to conduct; hence, a representation of naught is written into an island of the disk 140 by the transducer 83 or 85. Similarly, a positive pulse applied to the unit input terminal 132 causes the unit side of the circuit 150 to conduct, and a representation of a unit to be written into an island of the disk 140. Also, a negative puse applied to the symmetrical input terminal 130 causes the circuit 150 to change from one state of conduction to the other, and thus record the appropriate representation into an island of the disk 140.

*Delay Line*

Figure 5:
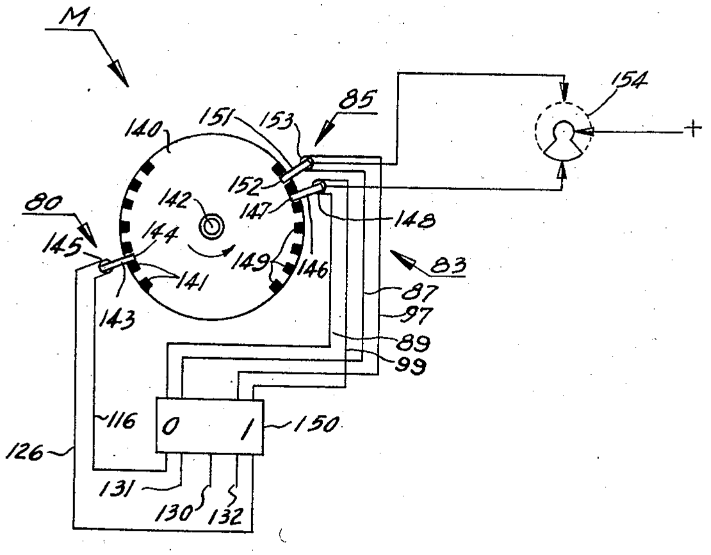
Fig. 5 is a diagram of a magnetic disk recirculation memory register used in the embodiments of the invention.

Another element employed in the invention is a delay line, which can be a distributed parameter delay line of the type disclosed in Fig. 5 of U.S. Patent No. 2,467,857, issued April 19, 1949, to J. H. Rubel et al., to which reference is made for a full description. Pulses impressed upon an input terminal of this delay line are delayed a required interval and then appear at an output terminal.

Alternatively, other delay circuits, such as the well-known lumped parameter delay line, can be employed. In fact, it is often possible to choose circuit components so that a necessary delay results from the time constants associated with the circuit in which case a separate delay element is unnecessary. However, for clarity of explanation delay lines are shown in the accompanying drawing wherever a delay is necessary for the proper operation of the invention.

*Single arming gate and double arming gate*

Figure 1A:
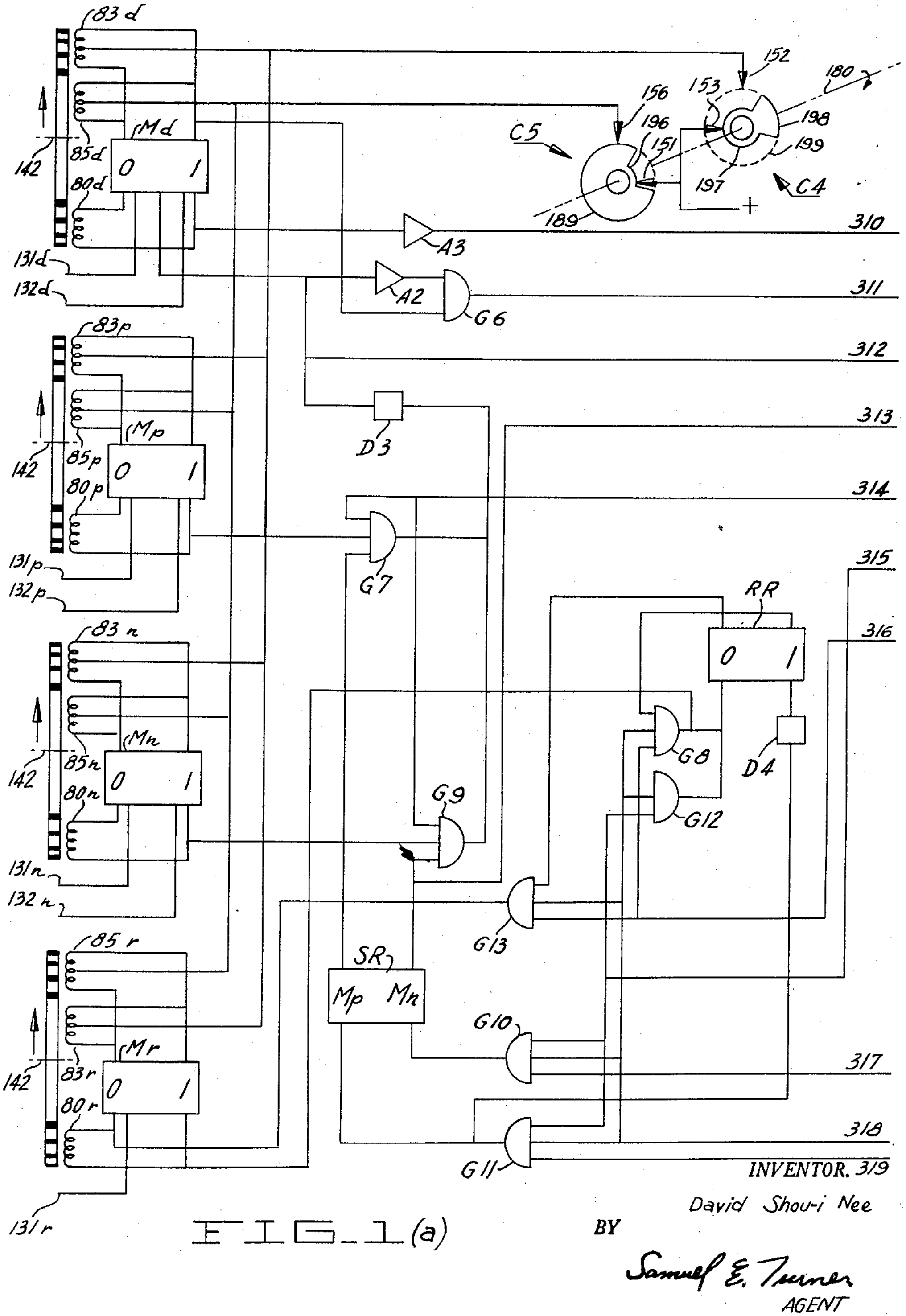
Figure 1B:
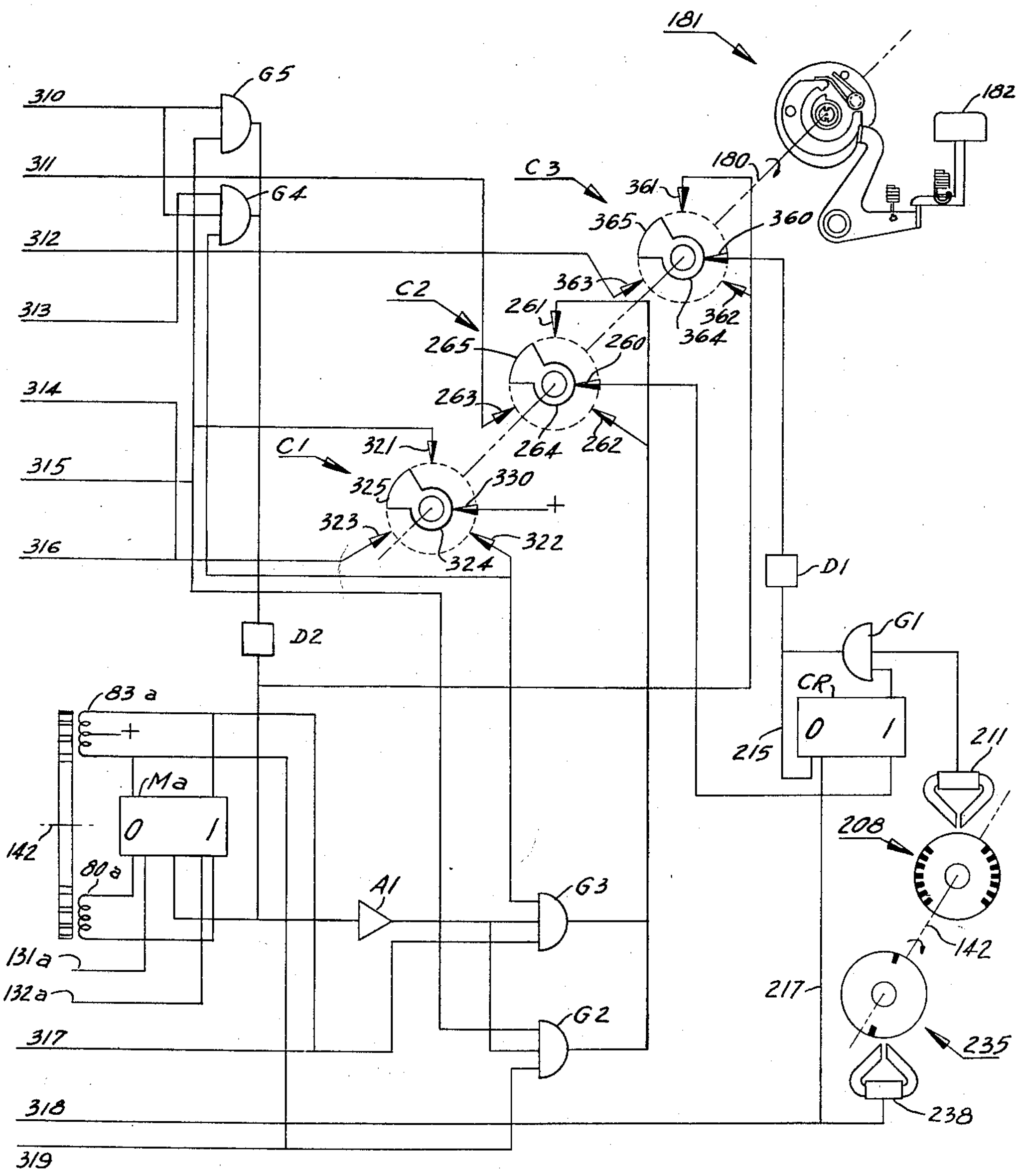

Single arming gates such as G1 of Fig. 1*b* and double arming gates such as G2 of Fig. 1*b* can be of any suitable type. A typical circuit which can be used is shown and described at pages 78, 79, and 80 of the above-mentioned Automatic Digital Calculators.

*Amplifiers*

Amplifiers A1, A2, and A3 of Fig. 1*a* and Fig. 1*b* can be of any suitable type. A typical amplifier which can be used is shown and described by Elmore and Sands at pages 45, 46, and 47 of Electronics, published by McGraw-Hill, New York.

*Adder and adder-subtractor circuits*

The following is an analysis of the binary arithmetic performed by the adder and adder-subtractor circuits of the invention.

In binary addition, there are four possible additive combinations of two positive operands.

| | | | | |
|---|---|---|---|---|
| $x$ | 0 | 1 | 0 | 1 |
| $+y$ | +0 | +0 | +1 | +1 |
| Sum | 0 | 1 | 1 | 0 (carry +1) |

It is noted that a carry occurs in the last sum. In a multi-digit binary addition, the operation of entering the carry into the next higher column gives rise to a second set of four additive combinations:

| | | | | |
|---|---|---|---|---|
| +carry | +1 | +1 | +1 | +1 |
| $x$ | 0 | 1 | 0 | 1 |
| $+y$ | +0 | +0 | +1 | +1 |
| Sum | 1 | 0 (carry +1) | 0 (carry +1) | 1 (carry +1) |

Similarly, the subtraction of a binary digit from another binary digit gives rise to four algebraic combinations:

| | | | | |
|---|---|---|---|---|
| $x$<br>$-y$ | 0<br>−0 | 1<br>−0 | 1<br>−1 | 0<br>−1 |
| Difference | 0 | 1 | 0 | 1 (carry −1) |

It is noted that a unit carry is part of the result of the last combination. This unit carry gives rise to a second set of algebraic combinations wherein the first four combinations are combined with the unit carry:

| | | | | |
|---|---|---|---|---|
| −carry<br>$x$<br>$-y$ | −1<br>0<br>−0 | −1<br>1<br>−0 | −1<br>1<br>−1 | −1<br>0<br>−1 |
| Difference | 1 (carry −1) | 0 | 1 (carry −1) | 0 (carry −1) |

The adder circuit is arranged to solve only the eight addition problems, while the adder-subtractor circuit is arranged to solve both the addition and subtraction problems.

*Adder circuit*

Figure 6:
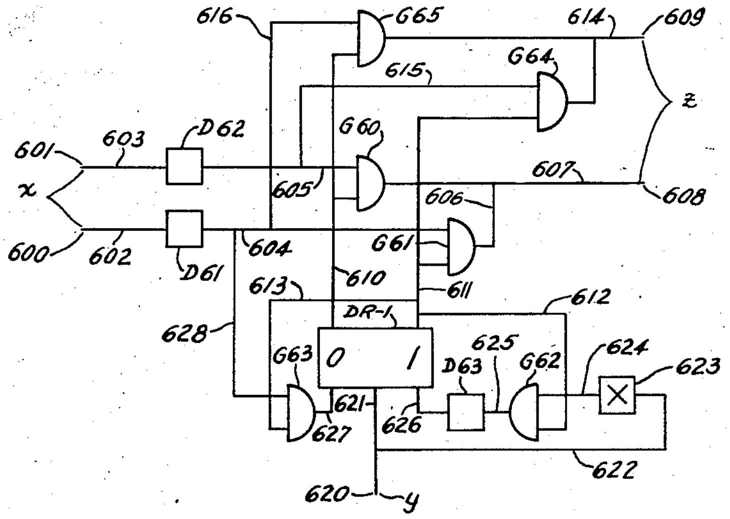
Fig. 6 is a schematic diagram of an adder circuit used in the second embodiment.

The adder circuit as shown in Fig. 6 carries out the operations of adding a word contained in a register Y to a word contained in a register X and entering the sum into a register Z (none of the registers are shown). The circuit adds the digit in each column of the register Y to the corresponding digit in the register X and the sum is shifted into the register X. If a carry results from a columnar addition, the circuit stores the carry digit and adds it to the next columnar pair of operand digits. In theory of operation, the X operand passes through the adder and is modified by the Y operand. Therefore, in order that the Y operand may set up the control conditions, it is entered into the adder before the X operand.

Referring to the Fig. 6, the adder circuit comprises a dual reciprocircuit DR–1 and a series of gates G60, G62, G63, G64 and G65 which are armed by potentials from the outputs of the circuit DR–1. The naught output terminal of the circuit DR–1 is connected to the gates G60 and G65 by a control lead 610 so that when the circuit DR–1 is in its naught condition, the gates G60 and G65 are armed. Similarly, the unit output terminal of the circuit is connected to the gates G61, G62, G63, and G64 by the control leads 611, 612, and 613 so that when the circuit DR–1 is in its naught condition the gates G61 and G64 are armed.

Positive pulses representing naughts are applied to a terminal 600 from the X register, and positive pulses representing units are applied to the terminal 601, also from the X register. The terminal 600 is connected through a lead 602, a delay line D61, a lead 604, and a lead 616 to the interrogation inputs of the gates G61 and G65. The output of the gate G61 is connected to a unit output terminal 608 by a lead 606 and a lead 607. The terminal 608 is connected to the unit input of the Z register.

The output of the gate G65 is connected to a naught output terminal 609 by a lead 614. The terminal 609 is connected to the naught input of the Z register. Similarly, the terminal 601 is connected through a lead 603, a delay line D62, a lead 605, and a lead 615 to the interrogation inputs of the gates G60 and G64. The output of the gate G60 is connected to the units output terminal 608 by the lead 607. The output of the gate G64 is connected to the naughts output terminal 609.

Pulses representing units from the output of the Y register are applied through a terminal 620 and a lead 621 to the symmetrical input of the circuit DR–1. A lead 622 connects the lead 621 through a suitable pulse transformer 623 and a lead 624 to the input of the gate G62. The output of the gate G62 is connected through a lead 625, a delay line G63, and a lead 626 to the unit input terminal of the circuit DR–1. A lead 628 connects the output of the delay line D61 to the input of the gate G63. The output of the gate G63 is connected by a lead 627 to the naught input terminal of the circuit DR–1.

In order to fully set forth the operation of the adder circuit of Fig. 6, its response to each of the eight previously outlined addition combinations is described.

In the first combination (0+0=0), a naught pulse is applied to the terminal 600 and no pulse is applied to the terminal 620. The circuit DR–1 is initially in its naught condition and therefore remains in its naught condition. The naught pulse applied to the terminal 600 is conducted by the lead 602 to the input of the delay line D61. After passing through the delay line D61, the pulse is applied to the inputs of the gates G61, G63 and G65. Since the circuit DR–1 is in its naught condition, the gate G65 is armed by the potential from the naught output of the circuit DR–1 applied through the lead 610 to an arming terminal of the gate G65. The gates G61 and G63 are not armed and the pulse therefore passes through only the gate G65 and is conducted by the lead 614 to the naught output terminal 609. Thus, a pulse at the terminal 608 representing the correct sum (unit) is available to the Z register.

In the second combination (0+1=1), a unit pulse is applied to the terminal 601 and no pulse is applied to the terminal 620. The circuit DR–1 is initially in its naught condition and therefore remains in its naught condition. The unit pulse applied to the terminal 601 is conducted by the lead 603 to the input of the delay line D62. After passing through the delay line D62, the pulse is applied to the inputs of the gates G60 and G64. Since the circuit DR–1 is in its naught condition the gate G60 is armed by the potential from the naught output of the circuit DR–1 applied through the lead 610 to an arming terminal of the gate G60. The gate G64 is not armed and the pulse therefore passes through only the gate G60 and is conducted by the lead 607 to the naught output terminal 608. Thus, a pulse at the terminal 608 representing the correct sum (unit) is available to the Z register.

In the third combination (1+0=1), a unit pulse is applied to the terminal 620 and a naught pulse is applied to the terminal 600 and is conducted by the lead 602 to the input of the delay line D61. The circuit DR–1 is initially in its naught condition but changes to its unit condition in response to the unit pulse applied through the lead 621 to its symmetrical input. After the circuit DR–1 changes its unit condition, the naught pulse emerges from the delay line D61 and is applied to the inputs of gates G61, G63, and G65. Since the circuit DR–1 is in its unit condition, the gates G61 and G63 are armed by the potential from the unit output of the circuit DR–1 applied through the leads 611 and 613 to the arming terminals of the respective gates. The gate G65 is not armed, and therefore the naught pulse passes through the gate G61 and is conducted by the leads 606 and 607 to the unit output terminal 608. Thus, a pulse at the terminal 608 representing the correct sum (unit) is available to the Z register. The naught pulse from the delay line D61 also passes through the armed gate G63 and is conducted by the lead 627 to the naught input of the circuit DR–1 thereby placing it in its naught condition.

In the fourth combination (1+1=0 with a 1 carry), a unit pulse applied to the terminal 620 places the circuit DR–1 in its unit condition. The positive potential from the unit output of the circuit DR–1 is applied through the leads 611, 612, and 613 to the arming terminals of the gates G61, G62, G63, and G64. A unit pulse applied to the unit input terminal 601 is conducted by the lead 603 to the input of the delay line D62. Emerging from the delay line D62, the pulse is conducted by the lead 615 to the input of the armed gate G64 and the pulse therefore passes through the gate G64 and is conducted to the naught output terminal 609. Thus, a pulse representing the correct sum (naught) is available to the Z register. Since the circuit DR–1 remains in its unit condition, a unit carry is represented by this condition of the circuit DR–1.

In combinations 5 through 8, inclusive, the circuit DR–1 initially is in its unit condition before the pulses from the operand registers are received, indicating a carry from the previous column; therefore, the gates G61, G62, G63, and G64 are armed.

In the fifth combination, a naught pulse is applied to the terminal 600. Since no pulse is applied to the symmetrical input of the circuit DR–1, the gates G61, G62, G63, and G64 remain armed. When the naught pulse is applied to the terminal 600, it passes through the gate G61 to the terminal 608, so that a unit sum is available to the Z register. The naught pulse also passes through the gate G63 to place the circuit DR–1 in its naught condition and thereby cancel the carry. In the sixth combination, a unit pulse is applied to the terminal 601. This pulse is passed by the armed gate G64, so that a naught pulse appears at the terminal 609 as a naught sum available to the Z register. The circuit DR–1 remains in its unit condition, thus indicating another unit carry.

In combinations 7 and 8, the circuit DR–1 is initially in its unit condition and a unit pulse is applied to the terminal 620. The unit pulse from the Y register applied to the terminal 620 passes through the armed gate G62 and into the delay line D63. At the same time this pulse places the circuit DR–1 in its naught condition. The delay time associated with the delay line D63 is greater than those associated with the delay lines D61 and D62, so that the adder receives the X operand pulse before it receives the pulse passed through the gate G62. After the circuit DR–1 is placed in its naught condition by the Y operand pulse, a naught X operand pulse (in the seventh combination) appears on the lead 604 and is conducted through the armed gate G65 to the naught output terminal 609. Thus, the correct sum of naught is made available to the Z register. Subsequently, the delayed pulse in the delay line D63 places the circuit DR–1 in its unit condition, indicating a unit carry. In the eighth combination, after the circuit DR–1 is placed in its naught condition by the Y operand pulse, a unit operand pulse appears on the lead 605 and is passed through the now armed gate G60, so that a pulse appears on the terminal 608 and a unit sum is made available to the Z register. Subsequently, the delayed pulse delay line D63 places the circuit DR–1 in its unit condition, indicating a unit carry.

*Adder-subtractor*

Figure 7:
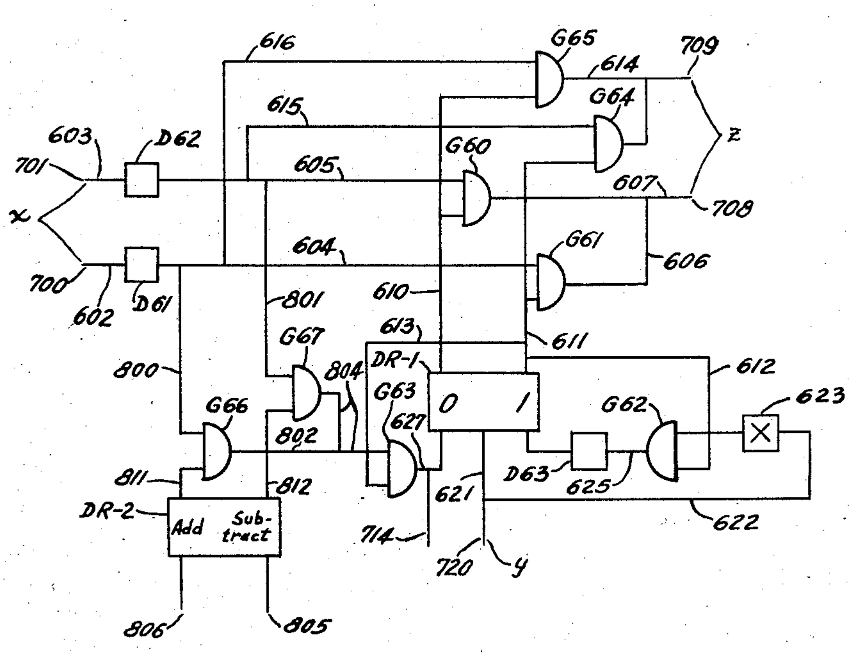
Fig. 7 is a schematic diagram of an adder-subtractor circuit used in the second embodiment.

The adder-subtractor is a circuit which adds two numbers or subtracts a smaller number from a larger number. Referring to the Fig. 7, certain portions of the adder-subtractor are similar to portions of the adder (Fig. 6) and are correspondingly numbered. In addition to the circuitry shown in Fig. 6, Fig. 7 includes a second dual reciprocircuit DR–2, a reset terminal 714, a gate G66, and a gate G67. The circuit DR–2 is employed to select the mode of the operation, namely, addition or subtraction. When the circuit DR–2 is in its "add" condition, the word in the Y register is added to the word in the X register, and when the circuit DR–2 is in its "subtract" condition, the word in the Y register is subtracted from the word in the X register. The sum or difference is made available to the Z register. The circuit DR–2 is placed in its "add" or "subtract" condition by a control pulse applied to a respective operation control terminal 805 or 806.

The arming terminal of gate G66 is connected by a control lead 811 to the "add" output terminal of the circuit DR–2; therefore, the gate G66 is armed when the circuit DR–2 is in its "add" condition. The input of the gate G66 has a connecting lead 800 from the lead 604 which transmits delayed naught pulses from the X register. The output of the gate G66 is connected by a lead 802 to the input of the gate G63. The arming terminal of the gate G67 is connected by a control lead 812 to the "subtract" output terminal of the circuit DR–2; therefore, the gate G67 is armed when the circuit is in its "subtract" condition. The input of the gate G67 has a connecting lead 801 from the lead 605 which transmits delayed unit pulses from the X register. The output of the gate G67 is connected by a lead 804 to the input of the gate G63.

When the circuit DR–2 is in its "add" condition and consequently the gate G66 is armed, the adder-subtractor circuit operates in the same manner as the adder circuit of Fig. 6.

When the circuit DR–2 is in its "subtract" condition, the digit in each column in the Y register is subtracted from the digit in the corresponding column in the X register and if a unit carry occurs the circuit DR–1 stores the carry until the next columnar pair of digits is subtracted. The result of each columnar subtraction is made available to the Z register.

There are eight possible subtraction combinations, as outlined previously, and each of these eight combinations of subtraction will be considered. In the first four combinations, the circuit DR–1 is initially placed in its naught condition by a pulse applied to the reset terminal 714.

In the combinations 1 and 2, the Y operand is a naught; therefore the circuit DR–1 remains in its naught condition and the gates G60 and G65 remain armed while the gates G61, G62, G63, G64, and G66 are unarmed. In the first combination, the X operand is a naught. The corresponding naught pulse on the lead 604 is conducted by the gate G65 to the naught output terminal 709 and the correct difference is therefore available to the Z register. In the second combination, the X operand is a unit. The corresponding pulse on the lead 605 is transmitted to the terminal 708 through the armed gate G60, so that a unit difference is available to the Z register.

In the third combination, the value in both operand registers is a unit. The unit pulse from the Y register reverses the circuit DR–1, thereby arming the gates G61, G62, G63, and G64. The unit pulse from the X register is passed through the gate G64 to the naught output terminal 709 so that a naught sum is made available to the Z register. The unit pulse from the X register also passes through the armed gates G67 and G63 to place the circuit DR–1 in its naught condition, indicating that there is no carry.

In the fourth combination the subtraction of a unit in the Y register from a naught in the X register causes a naught difference with a unit carry. This is accomplished as follows: The unit pulse from the Y register places the circuit DR–1 in its unit condition and the delayed naught pulse from the X register is passed through the armed gate G61 to the unit output terminal 708 thereby making available a unit sum to the Z register. The circuit DR–1 remains in its unit condition indicating a carry to the next column.

The combinations 5–8, inclusive, repeat the four above combinations with, in each instance, a unit carried from the previous column, so that the circuit DR–1 is initially in its unit condition.

In the combinations 5 and 6, a naught pulse from the Y register has no effect on the circuit DR–1 and it therefore remains in its naught condition. A delayed naught pulse from the X register (combination 5) passes through the armed gate G61; therefore, a unit difference is available to the Z register. The circuit DR–1 remains in its unit condition indicating another unit carry. In the sixth combination, the value in the X register is a unit. Therefore, the unit pulse interrogates the armed gate G64, so that a naught difference is made available to the Z register at the terminal 709. Also the unit pulse from the X register is transmitted by the lead 801, the armed gate G67, the lead 804, the armed gate G63, and the lead 627 to the naught input of the circuit DR–1 and thereby places the circuit DR–1 in its naught condition, indicating the absence of a carry to the next column.

In the combinations 7 and 8, the circuit DR–1 is initially in its unit condition and a unit is in the Y register. The unit pulse from the Y register passes through the armed gate G62 and into the delay line D63. This pulse also places the circuit DR–1 in its naught condition. The delay time associated with the delay line D63 is greater than those associated with the delay lines D61 and D62, so that the circuit receives the X operand pulse before it receives the pulse passed through the gate G62. After the circuit DR–1 is placed in its naught condition by the Y operand pulse, the X naught operand pulse (in the seventh combination) appears on the lead 604 and is passed by the armed gate G65, so that a naught pulse appears at the terminal 709 and a difference of naught is made available to the Z register. Subsequently, the delayed pulse in the delay line D63 places the circuit DR–1 in its unit condition, indicating a unit carry. In the eighth combination, after the circuit DR–1 is placed in its naught condition by the Y operand pulse, a unit operand pulse appears on the lead 605 and is passed through the now armed gate G60, so that a pulse appears on the terminal 708 and a unit difference is made available to the Z register. Subsequently, the delayed pulse in delay line D63 places the circuit DR–1 in its unit condition, indicating a unit carry to the next column.

*Method for extracting the square root of a binary number*

As an aid to a clear understanding of the invention, a development of the method of extracting binary square roots of binary numbers is presented below.

In the decimal numbering system, consider the series 0, 1, 2, 3, 4, 5, . . . (N—1), N and the corresponding square of each number in the series: 0, 1, 4, 9, 16, 25, . . . $(N-1)^2$, $N^2$. If each number of the square series is subtracted from the immediately following number, a corresponding difference series is obtained: 1, 3, 5, 7, 9, . . . $(N^2-(N-1)^2)$. The last term of the difference series reduces to 2N—1. A portion of the series may be related as follows:

| N | $N^2$ | 2N−1 |
|---|---|---|
| 1 | 1 | 1 |
| 2 | 4 | 3 |
| 3 | 9 | 5 |
| 4 | 16 | 7 |
| 5 | 25 | 9 |
| 6 | 36 | 11 |
| 7 | 49 | 13 |
| 8 | 64 | 15 |
| 9 | 81 | 17 |
| 10 | 100 | 19 |

It is noted that the numbers of the difference series are successive odd numbers.

Furthermore, the addition of numbers of the difference series from the top of the column to any subsequent larger number produces a sum equal to the corresponding number in the square series. For example, the sum of 1+3+5+7 is 16. Also, the number of additions (4 in the example) is equivalent to the square root of the number of the square series (16 in the example). Thus, to find the square root of any number in the square series, successively subtract from each number of the difference series, starting with 1, from the square series number. When a difference of 0 occurs, count the number of subtractions. The number of subtractions is the square root. For example, 16—1=15, 15—3=12, 12—5=7, 7—7=0, which is 4 subtractions; and therefore the square root is also 4.

To obtain the square root of a number that is not a perfect square, add as many pairs of zeros as required to obtain the desired accuracy and then proceed as in the case of a perfect square. The square root of 200, correct to two places, is 14. To obtain 14, subtract successive odd numbers from 200 until an overdraft occurs. If accuracy to one more place is desired, subtract successive odd numbers from 200 to obtain 141. Add a pair of naughts for every additional desired root digit.

Since a series of subtractions of this kind is a long and tedious operation, the method is simplified by subtracting successive odd numbers from a higher decimal order. To accomplish this, pair off the orders of a radicand and make the first subtraction from the lowest order digit of the highest order pair. For example, 25 is the square root of '06'25 and may be obtained by the following process: 0625—0100=0525, 0525—0300=0225 and since subtraction of 0500 results in an overdraft, 2 is the number of subtractions and therefore the highest order root digit which corresponds to the highest order pair; for the same reason, i.e., 0500 results in an overdraft, the next subtractor is 0041, that is, 4 is one less than 5 and shifted one order to the right and then successive odd digits are subtracted from the lowest order of the next lower order pair; thus, the next series of subtractions are 0225—0041=0184, 0184—0043=0141, 0141—0045 =0096, 0096—0047=0049, 0049—0049=0000, 5 is the number of subtractions before an overdraft occurs and hence the lowest order of the root. The process is summarized as follows:

2 5<br>
√06 ' 25<br>
01 00<br>
05 25<br>
03 00<br>
02 25 } 2 subtractions before overdraft<br>
00 41<br>
01 84<br>
00 43<br>
01 41<br>
00 45<br>
00 96<br>
00 47<br>
00 49<br>
00 49<br>
00 00 } 5 subtractions before overdraft Square roots of binary numbers may be extracted in an analogous manner such as the square root of 011001. The process is summarized as follows:

1 0 1<br>
√01 ' 10 ' 01<br>
01 00 00<br>
00 10 01 } 1 subtraction before overdraft<br>
01 01 00<br>
11 01 01 } No subtractions before overdraft<br>
00 10 01<br>
00 10 01<br>
00 00 00 } 1 subtraction before overdraft The binary subtractors may be obtained in the same manner as the decimal subtractors, i.e., the initial subtractor is a 1 that is subtracted from the lowest order digit of the highest order pair; the next successive odd number is 11 and is therefore the next subtractor which is subtracted from the highest order pair of the difference resulting from the initial subtraction; the subtraction of 11 always results in an overdraft and therefore the next subtractor (first subtractor) is one less than 11 (10). The number 10 is shifted one place to the right and a 1 is placed in the order corresponding to the lowest order of the next lower order pair of the radicand. Then the first subtractor is subtracted from the difference resulting from the initial subtraction. Subsequent subtractors may be obtained using the same process.

However, the subtractors subsequent to the initial subtractor may be formulated by another process that produces identical results and which leads to a convenient statement of rules and definitions that are required to understand the operation of the circuits of the invention. Thus, the first subtractor in the above case may be obtained by modifying the initial subtractor in the following manner: $(010000+011000)1(2)^{-1}=010100$; and in the above example, the second subtractor may be obtained by modifying the second subtractor in a similar manner: $(010100-000010)1(2)^{-1}=001001$. These cases may be generalized using the following definitions and rules:

A radicand is designated by a symbol $R_0$.

A "first remainder" is designated by a symbol $R_1$. Subsequent remainders are designated by symbols $R_2$, $R_3$, . . . $R_{n-1}$, $R_n$.

An "initial subtractor" is designated by a symbol $S_0$ and is defined by the formula $S_0=1(2)^{2x-2}$, where $x$ is equal to one-half the number of orders of a radicand that has an even number of orders; and in the case of an odd number of orders in a radicand, $x$ is equal to one-half the number of odd orders plus one. For example, if the radicand contains 5 binary digits, then $x=3$; if the radicand contains 4 binary digits, then $x=2$. Subsequent subtractors are designated successively by symbols $S_1$, $S_2$, . . . $S_{n-1}$, $S_n$, the values for which are obtained by a method set forth hereinafter.

A "first additive subtractor modifier" is designated by a symbol $M_{as}$ and is defined by the formula $M_{as}=11(2)^{2x-3}$. Subsequent additive subtractor modifiers are designated by symbols $M_{as}'$, $M_{as}''$, $M_{as}'''$ . . . , the values for which are obtained successively by shifting the preceding additive subtractor modifier two binary places to the right.

A "first subtractive subtractor modifier" is designated by a symbol $M_{ss}$ and is defined by the formula $M_{ss}=1(2)^{2x-3}$. Subsequent subtractive subtractor modifiers are designated by symbols $M_{ss}'$, $M_{ss}''$, $M_{ss}'''$ . . . , the values for which are obtained successively by shifting the preceding subtractive subtractor modifier two binary places to the right.

The rules of procedure of this invention for determining the binary square root of a radicand requires a "routine cycle" for each order in the root. During the first routine cycle the highest order digit of the root is determined, and during subsequent routine cycles the lower order digits of the root are successively determined. Each routine cycle includes three steps.

The three steps of the first routine cycle, to obtain the highest order digit of a root are as follows:

(1) Subtract $S_0$ from $R_0$ to obtain a first remainder $R_1=R_0-S_0$. The subtraction of a subtractor from a radicand is always extended at least one order beyond the highest order of the subtractor or radicand, whichever is larger. The digit in the extended order of the remainder is a 0 if the subtractor is smaller than the radicand; the digit in the extended order of the remainder is a 1 if the subtractor is larger than the radicand. The rule is that a 0 in the extended order of the remainder indicates that the digit in the root order under consideration is a 1, and that a 1 in the extended order of the remainder indicates that the digit in the root order under consideration is a 0. An initial subtractor is defined by the formula $S_0=1(2)^{2x-2}$. By this definition the initial subtractor $S_0$ is always smaller than the corresponding radicand $R_0$. Thus, the digit in the extended order of a first remainder $R_1$ is always a 0; and therefore, the highest order of a root always contains a 1. Subsequent root orders, of course, may contain either a 1 or a 0 according to the above rule.

(2) Add $M_{as}$ to $S_0$ to obtain a sum $S_0+M_{as}$.

(3) Shift the number obtained from step 2 one binary place to the right to become $S_1$. Shift $M_{as}$ and $M_{ss}$ two binary places to the right to become $M_{as}'$ and $M_{ss}'$ respectively.

The three steps of the second routine cycle to determine the digit in the second highest order of a root are as follows:

(1) Subtract $S_1$ from $R_1$ to obtain a second remainder $R_2=R_1-S_1$. According to the rule, if the digit in the extended order of $R_2$ is a 0, the second highest order digit of the root is a 1; if the digit in the extended order of $R_2$ is a 1, the second highest order digit of the root is a 0.

(2) Follow step (2—1) below, if the second highest order digit of the root is a 1. Follow step (2—0) below, if the second highest order digit of the root is a 0. (2—1) Add $M_{as}'$ to $S_1$ to obtain a sum of $M_{as}'+S_1$. (2—0) Subtract $M_{ss}'$ from $S_1$ to obtain a difference $S_1-M_{ss}'$.

(3) Shift the number obtained from step 2 one binary place to the right to become $S_2$. Shift $M_{as}'$ and $M_{ss}'$ two binary places to the right to become $M_{as}''$ and $M_{ss}''$ respectively.

To obtain successive lower orders of a root, follow the procedure of the second routine cycle.

As an example of the method, the binary square root of 100100 is developed below using the above rules:

$x=3$,
$R_0=0100100$,
$S_0=1(2)^{2x-2}=1(2)^4=0010000$,
$M_{as}=11(2)^{2x-3}=11(2)^3=0011000$, and
$M_{ss}=1(2)^{2x-3}=1(2)^3=0001000$.

The steps of the first routine cycle are as follows:

(1) $R_1=R_0-S_0=0100100-010000=010100$. The extended order of $R_1$ is a 0, therefore enter a 1 in the highest order of the root.

(2) $S_0+M_{as}=010000+0011000=0101000$.

(3) Shift the above sum one binary place to the right to obtain $S_1=0010100$. Shift $M_{as}$ and $M_{ss}$ two binary places to the right to obtain $M_{as}'=0000110$ and $M_{ss}'=0000010$.

The steps of the second routine cycle are as follows:

(1) $R_2=R_1-S_1=0010100-0010100=0000000$ The extended order of $R_2$ is a 0, therefore enter a 1 in the second highest order of the root.

(2) Since the second highest order digit of the root is a 1, follow step (2—1):

$$M_{as}'+S_1=0000110+0010100=0011010$$

(3) Shift the number obtained in step 2 one binary place to the right to obtain $S_2=0001101$. Shift $M_{as}'$ and $M_{ss}'$ two binary places to the right to obtain $$M_{as}''=0000001 \text{ and } M_{ss}''=0000000$$

The steps of the third routine cycle are as follows:

(1) $R_3=R_2-S_2=0000000-0001101=1110011$. The extended order digit of $R_3$ is a 1, therefore enter a 0 in the third highest digit order of the root.

(2) Since the third highest order digit of the root is a 0, follow step (2—0):

$$S_2-M_{ss}''=0001101-0000000=0001101$$

(3) Shift the number obtained in step 2 one binary place to the right to obtain $S_3=0000110$. Shift $M_{as}''$ and $M_{ss}''$ two binary places to the right to obtain $$M_{as}'''=0000000 \text{ and } M_{ss}'''=0000000$$

Thus, a 1 is derived in the first routine cycle, a 1 is derived in the second routine cycle, and a 0 is derived in the third routine cycle giving the correct root, viz., 110.

If the root is an integer, the developed answer is an integer as in the above example. If the root is irrational, the answer may be carried out to the extent of desired accuracy.

It should be noted that the subtractor $S_3$ obtained in the third step of the third routine cycle of the above example is the root of 100100. A subtractor developed during the third step of the last routine cycle, is always the correct root.

It should be noted also that the exponent $x$ is equal to the number of orders of the corresponding root. In addition, the number of routine cycles in extracting square root is equal to $x$.

*Definitions*

The following definitions will be helpful in understanding the invention:

A "word interval" is the time required for a complete group of islands on a magnetic disk to pass a corresponding transducer gap.

A "digit intervals" is the time required, within a word interval, for a single island to pass a transducer gap and for the next island to be ready to enter the gap.

A "control interval" is the elapsed time since the last island of a first group of islands has passed a transducer gap until the first island of a second group is ready to enter the gap.

A "word time" is a length of time equal to a word interval plus a control interval.

A "routine cycle" comprises three word times in the first embodiment.

Figure 3:
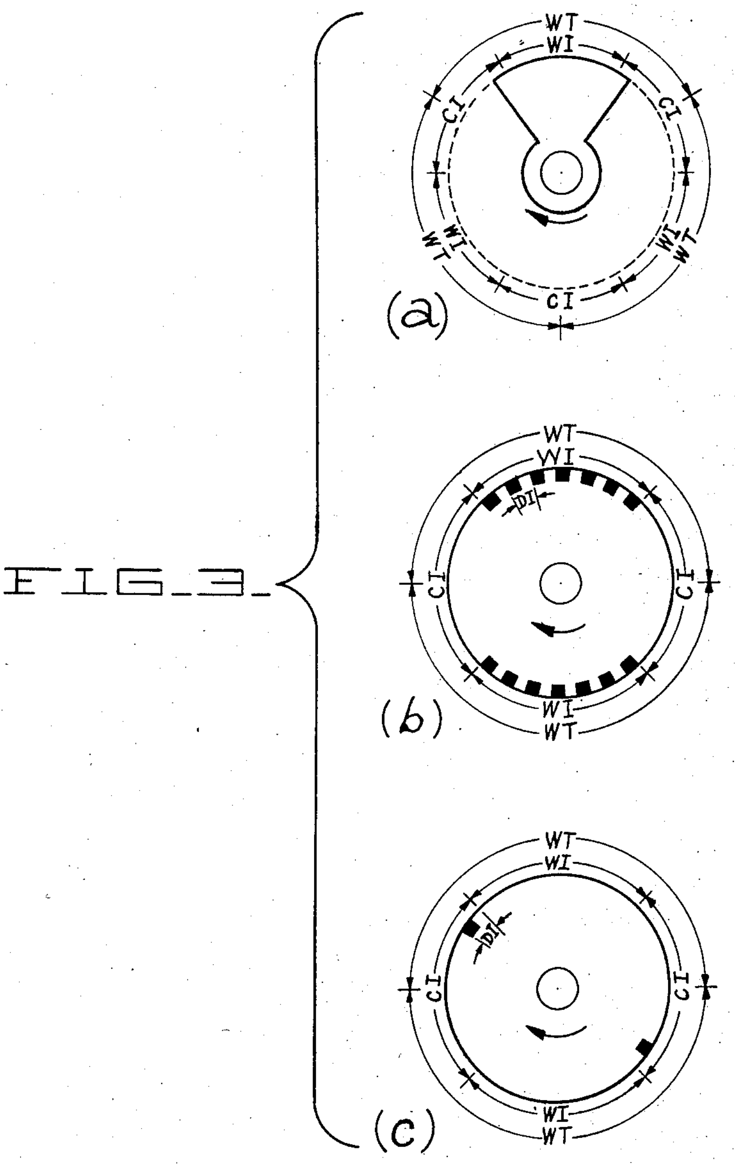

The above terms may be used for describing the relationship between commutators, storage disks, a clock disk, and a control disk as represented on Fig. 3.

Fig. 3*a* represents a commutator with peripheral lengths designated WT (word time), WI (word interval), and CI (control interval). The conducting segment of the commutator is at least the length traveled during a word interval plus three digit intervals.

Fig. 3*b* represents either a storage disk or a clock disk with designated peripheral lengths WT, WI, and CI. The length traveled during a WI extends from the beginning of the first island of a group to the end of the last island of the same group.

Fig. 3*c* represents a control disk with peripheral lengths WT, WI, and CI. Each magnetic island is located one DI (digit interval) after the end of the preceding WI.

During rotation of the commutators and the disks, the elapsed time for a designated length (WT, WI, or CI) of any of the disks to pass a stationary point is equal. Thus, the elapsed time for a single rotation of a commutator will be equal to three word times and the elapsed time for a single rotation of a storage disk or a control disk will be equal to two word times. Therefore, a routine cycle (three WT) occurs during one rotation of the commutators and 1½ rotations of the control and storage disks, thereby giving an r.p.m. ratio of 1½ to 1.

*Specific description*

The numerical procedure for deriving the square root of a binary number has been set forth hereinbefore. The circuit of the Fig. 1 (sections *a* and *b*) is arranged to obtain the square root of a binary number in a manner analogous to the example of the numerical procedure, i.e., a root is obtained by registering the digit, of the order under consideration, at the end of each routine cycle. The circuit and its operations will now be described.

A radicand, $R_0$, is entered into a register M*a* at a pair of terminals **131*a* and 132*a***. The corresponding initial subtractor, $S_0$, is entered into a register M*d* at a pair of terminals **131*d* and 132*d***. The corresponding additive subtractor modifier, $M_{as}$, is entered into a register M*p* at a pair of terminals **131*p* and 132*p***. The true complement of the corresponding subtractive subtractor modifier, $M_{ss}$, is entered into a register M*n* at a pair of terminals **131*n* and 132*n***. Naughts are entered into all orders of a register M*r* at terminal **131*r***.

It should be noted that the same subtractor and modifiers can be entered into the respective registers for any radicand having a number of orders within the capacity of the register M*a*. In the case of a radicand with a number of orders less than the capacity of the register M*a*, the higher orders of the root are, of course, merely naughts.

The words entered into the registers are recirculated until a square root operation is initiated by engaging a driving shaft and a driven shaft of a clutch 181 by depressing a key 182. The clutch 181 may be of the type shown in Fig. 3 of U.S. Patent No. 2,162,238, issued June 13, 1939 to H. T. Avery et al., reference being made to this patent for a full description of the clutch. The clutch disclosed in the above-mentioned patent is modified for use in the invention by providing only one tooth on its ratchet, thereby permitting the clutch to engage only when its ratchet is in full cyclic position. The driving shaft of the clutch 181 is connected through gearing not shown in the shaft 142. The driven shaft of clutch 181 is connected through gearing not shown to a shaft 180. The gearing ratios are selected so that a single revolution of the clutch 181 occurs during a square root extraction. Thus, the gearing ratios are dependent on the capacity of the register M*a*. For example, if the largest radicand that may be entered into the register M*a* contains 30 digits, then 15 digits are contained in the root; and since one rotation of all the commutators (C1, C2, C3, C4, and C5) is required for obtaining each digit of the root, 15 rotations of the commutator are required to complete a square root operation. Therefore, the gearing ratio between the driven shaft of the clutch 181 and the commutator shaft 180 is selected so that the clutch 181 completes a single rotation during the time that the commutators complete 15 rotations. Also, since the disks mounted on the shaft 142 (control disk, clock disk, and storage disks of the registers) complete 1½ revolutions during the time that the commutators complete a single rotation, the gearing ratio between the driving shaft of the clutch 181 and the shaft 142 is selected so that the shaft 142 completes 22½ (1½×15) rotations during the time that the driving shaft of the clutch 181 completes a single rotation. The clutch 181 is designed so that engagement occurs only at a specific position after the depression of the key 182. Hence, depressing the key 182 initiates synchronized rotation between the commutators, register storage disks, a control disk 235, and a clock disk 208 for the duration of a square root operation.

The commutators of Fig. 1 (sections *a* and *b*) are shown in their unoperated or initial positions. The commutators will stop at these positions at the completion of the square root extracting process. Thus, brushes 321, 261, and 361 are at positions corresponding to the middle of the first control interval.

The circuit operation is explained below corresponding to the order of operation encountered during a typical routine cycle, i.e., the second routine cycle set forth in the section Method for Extracting the Square Root of a Binary Number. A routine cycle, as performed by the circuit of Fig. 1, consists of three word times. The circuit operation during each word time is as follows:

*First word time*

In their initial positions, the conducting segments 325, 265, and 365 of the commutators C1, C2, and C3 are in contact with the brushes 321, 261, and 361 respectively. These contacts, as well as a contact established through the commutator C5 cause the square root circuit to assume the following conditions.

A positive potential is connected by the commutator C5 through a brush 151, a slip ring 196, a conducting segment 189, a brush 156, and the non-shifting writing heads of registers M*d*, M*p*, M*n*, and M*r* to the reciprocircuits of the respective registers. With this connection, the words contained in the registers are recirculated without shifting. A circuit is completed through the commutator C1 so that a positive potential is supplied through a brush 330, a slip ring 324, a conducting segment 325, and a brush 321 to a gate G5 and a gate G12 for fully arming the gates G5 and G12. This positive potential is also supplied to a gate G2, a gate G10 and a gate G11 for partially arming the gates G2, G10, and G11.

The commutator C2 connects the output of the gate G2 through the brush 261, a segment 265, a ring 264, and a brush 260 to the units input of a bistable reciprocircuit CR.

The commutator C3 connects the output of a delay line D1 through a brush 360, a ring 364, a segment 365 and a brush 361 to the symmetrical input of the register M*a* and to the input of the gate G2.

During the word interval of the first word time, the subtractor in the register M*d* is subtracted from the radicand or remainder in the register M*a* and the difference is entered into the register M*a*.

During a digit interval, there are four possible subtractions:

(1) 1—1=0;
(2) 0—0=0;
(3) 1—0=1;
(4) 0—1=1 with a carry of 1.

Consider the first possible subtraction (1—1=0).

A unit pulse (radicant or remainder) is generated in the transducer **80*a*** and applied to the units input of the dual reciprocircuit of the register M*a*. Thus, the dual reciprocircuit of the register M*a* is placed in its unit condition.

A unit pulse (subtractor) is generated in the transducer **80*d*** and is applied to the units input of the dual reciprocircuit of the register M*d*. Thus, the dual reciprocircuit of register M*d* is placed in its unit condition. At the same time, the pulse generated in transducer **80*d* is transmitted through an amplifier A3, a lead 310**, the gate G5, and a delay line D2 to the symmetrical input of the register M*a*. Thus, the dual reciprocircuit of the register M*a* is placed in its naught condition. This condition represents the naught difference of the subtraction. The difference is recorded by transducer **83*a*** corresponding to the order in which the subtraction occurs.

Thus, a unit of the subtractor has been subtracted from a unit of the radicand or remainder and a difference of naught has been entered into the register M*a*.

Consider the second possible subtraction (0—0=0).

A naught pulse (radicand or remainder) is generated in the transducer **80*a*** and applied to the naughts input of the dual reciprocircuit of the register M*a*. Thus, the dual reciprocircuit of the register M*a* is placed in its naught condition.

A naught pulse (subtractor) is generated in the transducer **80*d*** and applied to the naughts input of the dual reciprocircuit of the register M*d*. Thus, the dual reciprocircuit of the register M*d* is placed in its naught condition.

Since there is no connection from the naught side of the transducer **80*d*** to the register M*a*, no further action occurs.

Thus, the naught of the subtractor has been subtracted from the naught of the radicand or remainder and a difference of naught has been effectively entered into the register M*a*.

Consider the third possible subtraction (1—0=1).

A unit pulse (radicand or remainder) is generated in the transducer **80*a*** and applied to the units input of the dual reciprocircuit of the register M*a*. Thus, the dual reciprocircuit of the register M*a* is placed in its unit condition.

A naught pulse (subtractor) is generated in the transducer **80*d*** and applied to the naughts input of the dual reciprocircuit of the register M*d*. Thus, the dual reciprocircuit of the register M*d* is placed in its naught condition.

Again, since there is no connection from the naught side of the transducer **80*d*** to the register M*a*, no further action occurs.

The naught of the subtractor has been subtracted from the unit of the radicand or remainder and a unit difference has been effectively entered into the register M*a*.

Consider the fourth possible subtraction (0—1=1 with a carry of 1).

A naught pulse (radicand or remainder) is generated in the transducer **80*a*** and is applied to the naughts input of the dual reciprocircuit of the register M*a*. Thus, the dual reciprocircuit of the register M*a* is placed in its naught condition. A positive potential from the naughts output of the dual reciprocircuit of the register M*a* is applied to a second arming terminal of the gate G2. Thus, the potential corresponding to the naught condition of the dual reciprocircuit of the register M*a* fully arms the gate G2 which previously was armed partially through commutator C1 to a positive potential.

A unit pulse (subtractor) is generated in head **80*d*** and is applied to the dual reciprocircuit of the register M*d* thereby placing it in its units condition. At the same time, the unit pulse is transmitted through the amplifier A3, the lead 310, gate G5, and the delay line D2, the amplifier A1, the gate G2, and the commutator C2 (a brush 261, a segment 265, a ring 264, and a brush 260) to the unit input of the circuit CR thus placing the circuit CR in its unit condition. A potential connected from the units output of the circuit CR to an arming terminal of a gate G1 arms the gate while the circuit CR is in its unit condition. The unit condition of circuit CR represents a stored unit carry.

The unit pulse from the transducer **80*d*** is also applied to the symmetrical input of the dual reciprocircuit of the register and thereby places it in its unit condition. Thus, a unit difference is registered in the register M*a* and a carry is stored by the circuit CR.

To completely understand the fourth subtraction as outlined above, each possible combination during the next digit interval should be considered with respect to the subtraction of 0—1. The combinations with the next digit interval are:

(1) 00—01=11 with a carry of 1;
(2) 10—11=11 with a carry of 1;
(3) 10—01=01;
(4) 00—11=01 with a carry of 1.

The second combination is the most illustrative of the circuit operation; so to avoid undue prolixity, only this combination will be analyzed.

During the next digit interval, a unit pulse (radicand or remainder) is generated in transducer **80*a***. The dual reciprocircuit of the register M*a* is thereby placed in its unit condition.

A carry pulse is generated in transducer 211 and is transmitted through the armed gate G1 to a naught input of the circuit CR to place the circuit in its naught condition. The carry pulse is also transmitted through a delay line D1 and the commutator C3 (a brush 360, a ring 364, a segment 365, and a brush 361) to the symmetrical input of the dual reciprocircuit of the register M*a* thereby placing it in its naught condition.

A unit pulse (subtractor) is generated in the transducer **80*d*** and is transmitted to the dual reciprocircuit of the register M*d*. The dual reciprocircuit of register M*d* is thereby placed in its unit condition. At the same time, the unit pulse is transmitted through the amplifier A3, the lead 310, the gate G5, and the delay line D2, the amplifier A1, the gate G2 (armed by the potential from the naught output of the register M*a*) and the commutator C2 to the unit input of the circuit CR. Thus, circuit CR is placed in its unit condition thereby arming the gate G1 and enabling transmission of a carry pulse during the next digit interval. The unit pulse from the transducer **80*d*** is also applied to the symmetrical input of the dual reciprocircuit of the register M*a* and thereby places it in its unit condition.

It should be noted that delay of the application of the carry pulse through the delay line D1 to the symmetrical input of the dual reciprocircuit of the register M*a* is less than the delay of the application of the subtractor pulse through delay line D2 to the register M*a*.

Thus, the difference 11 is registered in the register M*a* and the unit carry is stored by the circuit CR.

At the end of the first word interval, a remainder is contained in the register M*a* and the digit in the extended order of the remainder is either a unit or a naught. If the extended order digit is a naught, then the corresponding root digit is a unit. If the extended order digit is a unit, then the corresponding root digit is a naught. Thus, the seventh or extended order is reserved for the indication of a unit or naught to indicate the corresponding digit of the root. (The seventh order in the other registers remains in the naught condition and if desired, this order may be excluded in the other registers.) The output potentials of the dual reciprocircuit of the register M*a* at the end of the first word interval are used to place two bistable reciprocircuits in corresponding conditions: a root storage bistable reciprocircuit RR used to temporarily store the root digit is placed in a condition corresponding to the extended order digit; and a selector bistable reciprocircuit SR is placed in a condition corresponding to the extended order digit. The circuits RR and SR are placed in their respective conditions in the following manner:

Assume the highest order of the remainder is a unit. The gate G10 is fully armed by a potential applied through a lead 317 from the unit output of the register M*a* to a second arming terminal of the gate G10 and by a potential applied through the commutator C1 to the first arming terminal of the gate G10.

A control pulse is generated in the transducer 238 during the first digit interval of the control interval following the first word time. The control pulse is applied through a lead 318 and the gate G10 to the M*n* input of the circuit SR. Circuit SR is set to its M*n* condition and thereby partially arms a gate G9 and a gate G4 by means of a connection from its M*n* output to the first arming terminals of the gates G9 and G4. The partial arming of the gates G9 and G4 allows, during the third word time, the addition of the true complement of the subtractive subtractor modifier contained in the register M*n* to the subtractor contained in the register M*d* as explained hereinafter. The pulse from the transducer 238 is also connected through the lead 318 and through a gate G12 to the naught input of the circuit RR which is placed in its naught condition and thereby stores the naught to be entered into the root register M*r* after the third word interval, as will be explained hereinafter.

Now, assume the second possible condition of the register M*a* after the first word interval, i.e., the digit in the extended order of the remainder is a naught. The gate G11 is fully armed by a potential applied through a lead 319 from the naught output of the register M*a* to a second arming terminal of the gate G11 and by a potential applied through the commutator C1 to the first arming terminal.

Thus, a control pulse is applied through the lead 318 and the gate G11 to the M*p* input of the circuit SR. The circuit SR is set to its M*p* condition and thereby partially arms the gate G7. The arming of the gate G7 allows the additive substractor modifier in the register M*p* to be added to the subtractor in the register M*d* during the third word time, as will be explained hereinafter. The pulse from the transducer 238 also is conducted through the gate G12 to the naught input of the circuit RR to set the circuit RR to naught, and simultaneously, the pulse is conducted through the gate G11 to the delay line D4. After the circuit RR is placed in its naught condition, the pulse applied to the delay line D4 emerges and is applied to the units input of the circuit RR. The circuit RR is placed in its unit condition and thereby stores the unit that is entered into the root register M*r* after the third word interval, as will be explained hereinafter.

The pulse generated in the transducer 238 also resets carry bistable reciprocircuit CR to its naught condition, thereby canceling any carry from the previous word interval.

After the above operations occur, the conducting segments of commutators C1, C2, and C3 rotate out of contact with brushes 321, 261, and 361 respectively.

*Second word time*

During the control interval preceding the second word interval, the conducting segments 325, 265, and 365 of the commutators C1, C2, and C3 rotate into contact with the brushes 322, 262, and 365 respectively. These contacts, as well as the connections established through the commutator C5, cause the square root circuit to assume the following new set of conditions:

A positive potential is supplied through the commutator C5 and the non-shifting writing heads of the registers M*d*, M*p*, M*n*, and M*r* to the dual reciprocircuits of the respective registers.

The commutator C1 completes a circuit that supplies a positive potential through the brush 330, the ring 324, the segment 325 and the brush 322 to the second arming terminals of a gate G3 and a gate G4 for partially arming the gates G3 and G4.

The output of the gate G3, through the commutator C2, the brush 262, the segment 265, the ring 264, and the brush 260 to the units input of the bistable reciprocircuit CR. The output of the delay line D1 is connected through the commutator C3, the brush 360, the ring 354, the segment 365, and the brush 362 to the symmetrical input of the register M*a*.

During the second word interval, the subtractor in the register M*d* is added to the remainder in the register M*a* if the extended order digit of the remainder is a unit. If the extended order digit is a naught, the word contained in each of the registers is recirculated during the second word interval without any interaction or change.

In considering the case where the extended order digit of a remainder is a unit at the end of the first word interval, there will be four possible additions during any particular digit interval of the second word interval:

| | Digit in M*a* plus digit in M*d*=sum in M*a* |
|---|---|
| (1) | 0+1=1; |
| (2) | 1+0=1; |
| (3) | 0+0=0; |
| (4) | 1+1=0 with a carry of 1 |

Consider the first possible addition (0+1=1).

A naught pulse is generated in the transducer **80*a*** which sets the dual reciprocircuit of the register *Ma* to its naught condition.

A unit pulse is generated in the transducer **80*d*** which sets the dual reciprocircuit of the register M*d* to its unit condition and at the same time is transmitted through the amplifier A*s*, the lead 310, the gate G4, and the delay line D2 to the symmetrical input of the dual reciprocircuit of the register M*a* thereby placing it in its unit condition.

The unit of the subtractor has been added to the naught of the remainder and the unit sum has been entered into the register M*a*. Thus, the subtractor in the register Md remains unaltered, and the digit in the order of the register Ma under consideration has been restored to its value prior to the subtraction during the first word interval.

Consider the second possible addition (1+0=1).

A unit pulse is generated in the transducer 80*a*. The dual reciprocircuit of the register Ma is placed thereby in its unit condition.

A naught pulse is generated in the transducer 80*d*. The dual reciprocircuit of the register Md is placed thereby in its naught condition. Since there is no connection from the naught side of the transducer 80*d* to the register Ma, no further action occurs.

The naught in the register Md has been added to the unit in the register Ma and the sum has been recorded in the proper order of the register Ma.

Consider the third possible addition (0+0=0).

A naught pulse is generated in the transducer 80*d*. The dual reciprocircuit of the register Md is placed thereby in its naught condition. Since there is no connection from the naught side of the transducer 80*d* to the register Ma, no further action occurs.

The naught in the register Md has been added, effectively, to the naught in the register Ma and the sum has been recorded in the proper order of the register Ma.

Consider the fourth possible addition (1+1=0 with a carry of 1).

A unit pulse is generated in the transducer 80*a*. The dual reciprocircuit of the register Ma is placed thereby in its unit condition. An arming potential is applied through a connection from the unit output of the register Ma to a second arming terminal of the gate G3 thereby fully arming the gate G3. The gate G3 previously was armed partially by a potential applied through the commutator C1 to the first arming terminal.

A unit pulse is generated in the transducer 80*d*. The dual reciprocircuit of the register Md is placed thereby in its unit condition. At the same time, the unit pulse is transmitted through the amplifier Ad, the lead 310, the gate G4, the delay line D2, the amplifier A1, the gate G3, and the commutator C2 to the unit input of the carry bistable reciprocircuit CR, placing the circuit CR in its unit condition and thereby arming the gate G1. The unit condition of CR represents a unit carry stored in the circuit CR. The unit pulse from the transducer 80*d* also is applied to the symmetrical input of the dual reciprocircuit of the register Ma which is placed thereby in its naught condition. Thus, the sum of naught is registered in the register Ma, a unit carry is stored in the circuit CR.

To completely understand the circuit operation during the fourth possible addition as outlined above, each possible combination during the next digit interval should be considered with respect to the addition of (1+1). In the next digit interval, the possible combinations are:

(1) 11+11=10 with a carry of 1;
(2) 01+01=10;
(3) 01+11=00 with a carry of 1;
(4) 11+01=00 with a carry of1

The first combination is illustrative of the circuit operation; so to avoid undue prolixity, only this combination will be analyzed.

During the next digit interval, a unit pulse is generated in the transducer 80*a*. The dual reciprocircuit of the register Ma is placed thereby in its unit condition.

A carry pulse is generated in the transducer 211 which is transmitted through the armed gate G1 to the naught input of the circuit CR. The circuit CR is placed thereby in its naught condition. The carry pulse is also transmitted through the delay line D1 and the commutator C3 to the symmetrical input of the dual reciprocircuit of the register Ma so that it is placed thereby in its naught condition.

A unit pulse is generated in the transducer 80*d*. The dual reciprocircuit of the register Md is placed thereby in its unit condition. At the same time the unit pulse is transmitted through the amplifier A3, the lead 310, the gate G4, the delay line D2, the amplifier A1, the gate G3, and the commutator C2 to the units input of the carry bistable reciprocircuit CR. The circuit CR is thereby placed in its unit condition. Thus, the gate G1 is armed so as to transmit a carry pulse during the next digit interval. The unit pulse from the transducer 80*d* is applied also to the symmetrical input of the dual reciprocircuit of the register Ma which is placed thereby in its unit condition.

Thus, the sum of 10 is registered in the register Ma, and a unit carry is stored in the circuit CR.

During the control interval following the second word interval, the conducting segments of the commutators C1, C2, and C3 rotate out of contact with the brushes 322, 262, and 362 respectively.

*Third word time*

During the control interval preceding the third word interval, a conducting segment 198 of the commutator C4 rotates into contact with a brush 152 thereby providing a positive potential through a brush 153, a slip ring 197, the segment 198, the brush 152, and the shifting heads of the registers Md, Mp, Mn, and Mr to the dual reciprocircuits of the respective registers. The conducting segment 189 of the commutator C5 rotates out of contact with brush 156 thereby disconnecting the positive potential from the non-shifting heads of the registers Md, Mp, Mn, and Mr.

Thus, words in the registers Md, Mp, Mn, and Mr will be shifted appropriately during the third word interval.

The conducting segments of the commutators C1, C2, and C3 rotate into contact with the brushes 323, 263, and 363 respectively. The gates G7 and G9 are partially armed by a positive potential connected through the commutator C1.

During the third word interval, the word contained in the register Mp or the word contained in the register Mn is added to the word in the register Md. The choice is determined after the first word interval when the control pulse from the transducer 238 is conducted through either the gate G10 or the gate G11 to place the circuit SR thereby to either its Mn or Mp condition respectively. If the circuit SR is placed in its Mp condition, the word in the register Mp is added to the subtractor in the register Md; if the circuit SR is placed in its Mn condition, the word in the register Mn is added to the subtractor in the register Md.

Consider the first case: The word in the register Mp is added to the word in the register Md.

With the circuit SR in its Mp condition, the gate G7 is fully armed by a potential from the Mp output of the circuit SR to the first arming terminal of the gate G7 and by a positive potential applied through the commutator C1 and the lead 314 to a second arming terminal of the gate G7.

Four possible additions may occur:

(1) 1+1=0 with a carry of 1;
(2) 1+0=1;
(3) 0+1=1;
(4) 0+0=0

The operation of this part of the circuit is identical to the circuit operation when a subtractor in the register Md is added to a remainder in the register Ma, discussed previously. Therefore, only the first possible addition will be analyzed.

A unit pulse is generated in the transducer 80*d*. The dual reciprocircuit of the register Md is placed thereby in its unit condition. Thus, a gate G6 is armed by a potential from the unit output of the dual reciprocircuit of the register $Md$ applied through a connection to an arming terminal of the gate G6. A unit pulse is generated in a transducer 80$p$. The dual reciprocircuit of the register $Mp$ is placed therefore in its unit condition. The unit pulse passes through the gate G7 and is applied to a delay line D3. After a delay sufficient for the dual reciprocircuit of the register $Md$ to be placed in its unit condition, the pulse applied to the delay line D3 emerges and passes through the amplifier A2, the gate G6, and the commutator C2 (the brush 263, the segment 265, the ring 264, the brush 260) to the units input of the carry bistable reciprocircuit CR, thereby placing the circuit in its unit condition. The pulse from the delay line D3 also is applied to asymmetrical input of the dual reciprocircuit of the register $Md$ so that it is placed thereby in its naught condition.

Thus, a sum of naught is registered in the register $Md$ with a unit carry stored in the circuit CR.

Similar results are obtained when a subtractive subtractor modifier in the register $Mn$ is added to a subtractor in the register $Md$. In this case, the gate G9 is fully armed by a potential connected from the $Mn$ output of the bistable reciprocircuit SR to a second arming terminal and by a positive potential applied through C1 to the first arming terminal.

Words in the registers $Md$, $Mp$, $Mn$, and $Mr$ are shifted the proper number of binary places according to the method for obtaining a binary square root during the third word interval. Concurrently, the additive subtractor modifier or the subtractive subtractor modifier, as the case may be, is added to the subtractor.

Shifting is effected by energization of a shifting transducer and de-energization of a non-shifting transducer as hereinbefore discussed.

Finally, the digit of the root derived during the first word time must be entered into the register $Mr$.

During the control interval following the third word interval, a control pulse is generated in the transducer 238 which sets the circuit CR to its naught condition. The control pulse also is applied to the input of a gate G8. The gate G8 either passes or blocks the control pulse depending on whether a naught or unit is stored in the root bistable reciprocircuit RR. It will be recalled that the circuit RR stores the digit of the root derived during the first word time.

Since the control pulse occurs one digit interval after the last digit interval of the preceding word interval, the shifting transducer 83$r$, which shifts digits one order to the left, is in a position to record a unit or a naught in the lowest order island of the disk of the register $Mr$.

Assume the digit of the root under consideration is a naught. In this case, the circuit RR is placed in its naught condition. The gate G13 is fully armed by a potential applied through a connection from the naught output of the circuit RR to a first arming terminal of the gate G13 and by a positive potential applied through the commutator C1 to a second arming terminal. Thus, the control pulse is passed by the gate G13 to the naught input of the register $Mr$, thereby placing the bistable reciprocircuit of the register $Mr$ to its naught condition and thereby recording a naught in the lowest order of the register $Mr$.

Assume the digit of the root under consideration is a unit. In this case, the circuit RR is placed in its unit condition. The gate G8 is fully armed by a potential applied through a connection from the unit output of the circuit RR to a first arming terminal of the gate G8 and by a positive potential applied through the commutator C1 to a second arming terminal. Thus, the control pulse is passed by the gate G8; the pulse is applied to the naught input of the circuit RR, thereby placing it in its naught condition; and the pulse is applied to the unit input of the register $Mr$. Therefore, the bistable reciprocircuit of the register $Mr$ is placed in its unit condition and a unit is recorded in the lowest order of the register $Mr$.

*Second embodiment*

Figure 2A:
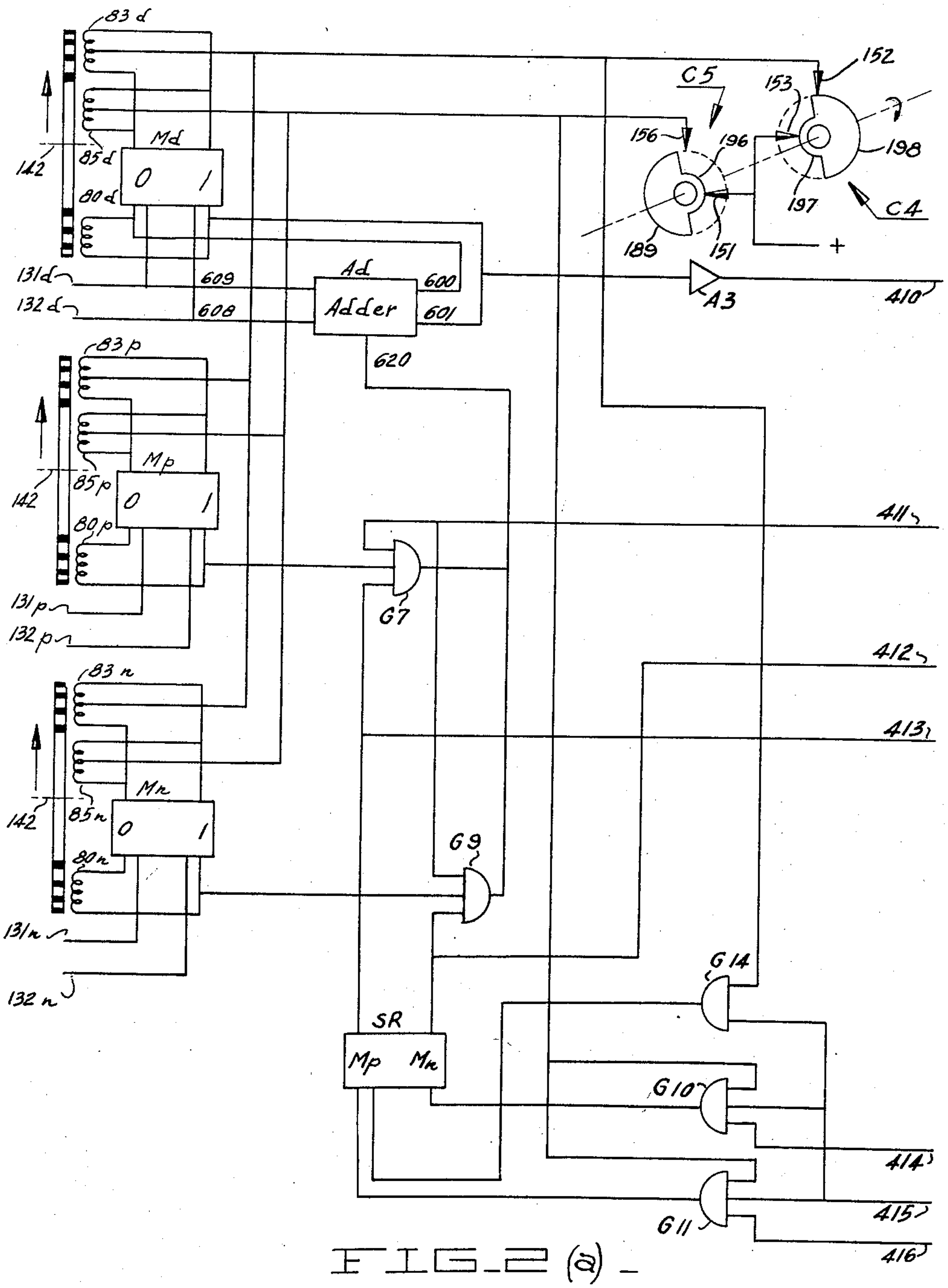
Figure 2:
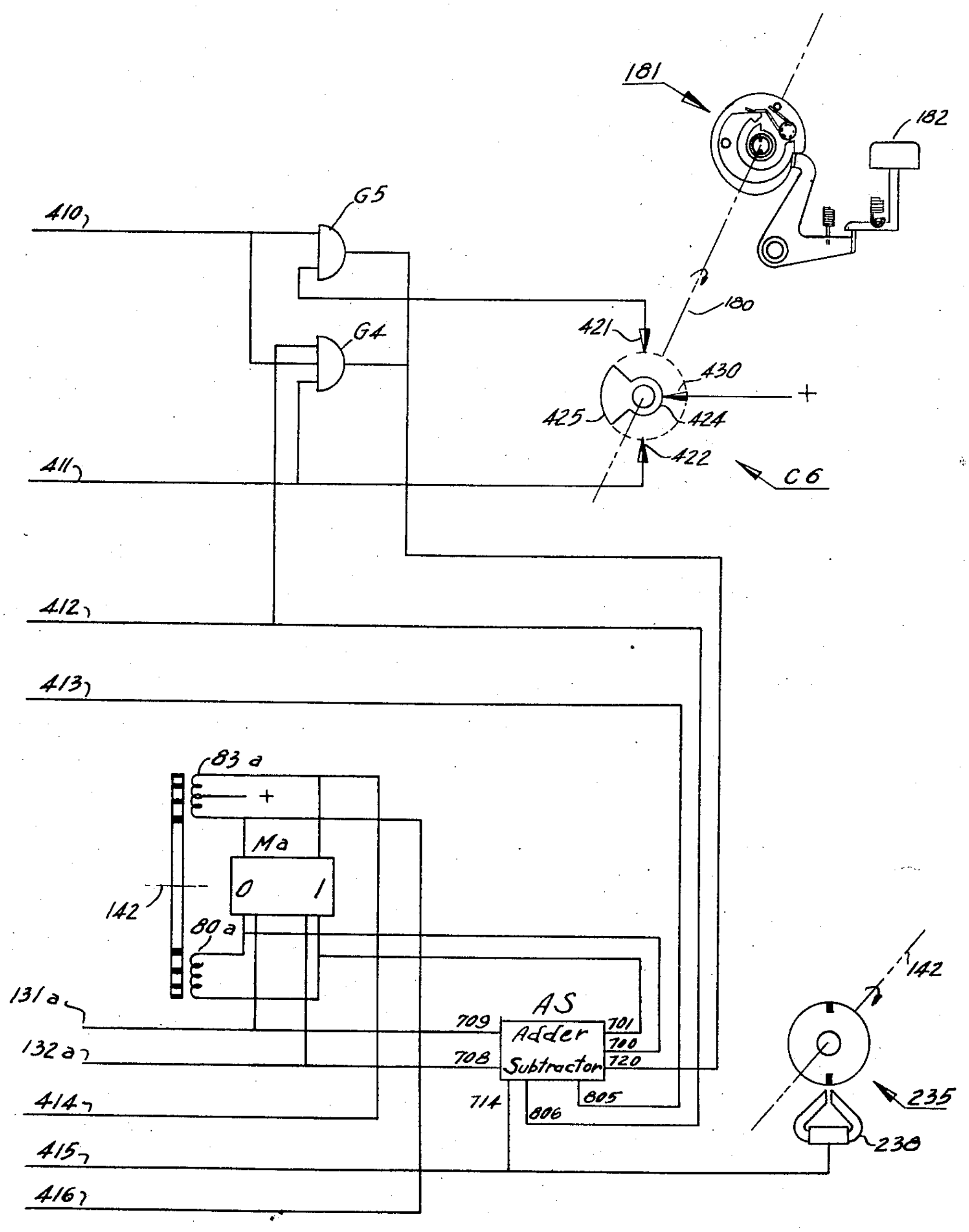

Fig. 2 is a diagram of another embodiment of the invention. This embodiment differs from the first embodiment in two respects. First, a separate adder circuit $Ad$ (Fig. 2$a$) and a separate adder-subtractor AS (Fig. 2$b$) are provided. Second, the square root register $Mr$ is removed so that the root is contained only in the subtractor register $Md$ at the end of a square root operation. These two modifications allow a routine cycle to be performed in two word times.

The definitions applied to the first embodiment apply also to the second embodiment with the exception of the routine cycle. In the second embodiment, the routine cycle is comprised of only two word times. Thus, the elapsed time for a single rotation of a commutator is equal to two word times and the elapsed time for a single rotation of a storage disk or a control disk is equal also to two word times. The commutators, therefore, complete 1 rotation while the control and storage disks complete 1 rotation, giving an r.p.m. ratio of 1 to 1.

Also, the driver shaft and the driven shaft of clutch 181 are geared to shaft 142 and shaft 180 respectively so as to allow as many rotations of the commutators as necessary to complete the square root operation.

The numerical procedure for deriving the square root of a binary number is set forth hereinbefore. The manner in which the circuit of Fig. 2 operates to obtain the square root of a binary number is described below.

A radicand, $R_0$, is entered into the register $Ma$ at the terminals 131$a$ and 132$a$. The corresponding subtractor, $S_0$, is entered into the register $Md$ at the terminals 131$d$ and 132$d$. The corresponding additive subtractor modifier, $M_{as}$, is entered into the register $Mp$ at the terminals 131$p$ and 132$p$. The corresponding subtractive subtractor modifier, $M_{ss}$, is entered into the register $Mn$ at the terminals 131$n$ and 132$n$. The information entered into the registers is recirculated until the square root operation is initiated by depression of the key 182.

The depression of the key 182 allows clockwise rotation of the clutch 181 and hence synchronized rotation of the commutators C4, C5, and C6 with the register storage disks, the control disk 235, and the clock disk 208.

The commutators of Fig. 2 are shown at positions prior to depression of the key 182. These positions are the ones at which the commutators will stop at the completion of the square rooting extracting process. Thus, the commutators C4, C5, and C6 are in positions corresponding to the middle of the control interval preceding the first word interval.

The circuit operation is explained below corresponding to the order of operation encountered during a typical routine cycle, i.e., the second routine cycle set forth in the section Method for Extracting the Square Root of a Binary Number. A routine cycle, as performed by the circuit of Fig. 2, consists of two word times. The circuit operation during each word time is as follows:

*First word time*

During the control interval preceding the first word interval, a conducting segment 425 of the commutator C6 rotates into contact with a brush 421. This contact completes a circuit from a positive potential through a brush 430, a ring 424, the segment 425, and the brush 421 to an arming terminal of the gate G5 and thereby fully arms the gate G5. Also, a conducting segment 189 of the commutator C5 rotates into contact with the brush 156 thereby applying a positive potential through a brush 151, a ring 196, the segment 189, the brush 156 and the non-shifting writing transducers of the registers $Md$, $Mp$, and $Mn$ to the respective reciprocircuits of the registers $Md$, $Mp$, and $Mn$.

During the word interval of a first word time, a subtractor in the register Md is subtracted from a radicand or remainder in the register Ma.

During a digit interval, there are four possible subtractions:

(1) 1—1=0;
(2) 0—0=0;
(3) 1—0=1;
(4) 0—1=1 with a carry of 1

Consider the first possible subtraction (1—1=0). A unit pulse is generated in the transducer 80*a*. The dual reciprocircuit of the register M*a* is placed thereby in its unit condition. The pulse is also applied to the terminal 701 of the circuit AS. A unit pulse is generated in the transducer 80*d*. The dual reciprocircuit of the register M*d* is placed thereby in its unit condition. At the same time the unit pulse is transmitted through the amplifier A3, the lead 410, and the gate G5, to the terminal 720 of the adder-subtractor circuit AS. A potential is applied through the lead 413 to the subtract terminal 805 of the circuit AS from the M*p* output terminal of the selector bistable reciprocircuit SR. During the first word interval, the circuit SR is always in the M*p* condition, as will become more clear hereinafter, and therefore the circuit AS is always in the subtract condition during the first word interval. Since the circuit AS is in a condition to subtract, a naught pulse appears at the terminal 709 and is applied to the naughts input of the register M*a* thereby placing the register M*a* in its naught condition.

The unit of the subtractor has been subtracted from the unit of the radicand or remainder and a remainder of naught has been entered into the register M*a*. Thus, the subtractor in the register M*d* remains unaltered, and the digit in the order of the register M*a* under consideration has been modified to become a difference according to the subtraction.

Consider the second possible subtraction (0—0=0). A naught pulse is generated in the transducer 80*a* and is applied to the naughts input of the register M*a* and thereby places the dual reciprocircuit of the register M*a* in its naught condition. This pulse is applied also to the terminal 700, the naught input of the circuit AS.

A naught pulse is generated in the transducer 80*d*. The register M*d* is thereby placed in its naught condition. The pulse is transmitted through the amplifier A3, the lead 410, and the gate G5 to terminal 720, to the units input of the circuit AS.

A potential from the M*p* output of the circuit SR is applied through the lead 413 to the subtract terminal 805 of the adder-subtractor circuit AS. A naught output is obtained at the terminal 709 and is applied to the naughts input of the register M*a* thereby placing the dual reciprocircuit of the register M*a* in its naught condition.

Thus, a naught in the register M*d* has been subtracted from a naught in the register M*a* and the remainder of naught has been registered in the register M*a*.

Consider the third possible subtraction (1—0=1). A unit pulse is generated in the transducer 80*a* and is applied to the unit input of the register M*a* thereby placing the dual reciprocircuit of the register M*a* in its unit condition. This pulse is applied also to the units terminals 701 of the circuit AS. At the same time, a naught pulse is generated in the transducer 80*d*. This pulse places the dual reciprocircuit of the register M*d* in its naught condition, but is not transmitted to the adder-subtractor circuit AS. Therefore, since no pulse is applied to the terminal 720, a naught is entered at the terminal 720.

A potential from the M*p* output of the circuit SR is applied through lead 413 to the subtract terminal 805. Therefore, a naught is subtracted from a unit in the register M*a* and a unit output pulse appears at the terminals 708. This pulse is applied to the units input of the register M*a* thereby placing the dual reciprocircuit of the register M*a* in its unit condition and thereby registering a unit difference in the register M*a*.

Consider the fourth possible subtraction (0—1=0 with a carry of 1). A naught pulse is generated in the transducer 80*a* and applied to the naught input of the dual reciprocircuit of the register M*a* so that it is placed thereby in its naught condition. This pulse also is applied to the naught terminal 700 of the circuit AS. A unit pulse is generated in the transducer 80*d* and is applied to the unit input of the register M*d*. This pulse also is applied through the amplifier A3, the lead 410, and the gate G5 to the terminal 720 of the circuit AS. A potential is applied from the M*p* output of the circuit SR through the lead 413 to the subtract terminal 805 thereby maintaining the circuit AS in the subtract condition. After a naught pulse is applied to the terminal 700 of the circuit AS and a unit pulse is applied to the terminal 720, a unit pulse emerges from the terminal 708 and is applied to the unit input of the register M*a* thereby setting the dual reciprocircuit of the register M*a* to its unit condition. Thus, a unit difference is registered in the register M*a*. The circuit AS stores a unit carry as explained hereinbefore in the section "Circuit Elements."

During the first digit interval of the control interval following the first word interval, a pulse is generated in the transducer 238. This pulse is applied to the terminal 714 of the circuit AS and places the carry dual reciprocircuit of AS in its naught condition canceling any carry from the prior word interval. The pulse from the transducer 238 is also applied through the lead 415 to the inputs of the gates G10 and G11. If, at the end of the first word time, the dual reciprocircuit of the register M*a* is in its unit condition, a potential from the units output of the register M*a* is applied through the lead 414 to a first arming terminal of the gate G10. A second arming potential is applied, throughout the first word time, from a positive potential through the commutator C5 (the brush 151, the ring 196, the segment 189 and the brush 156) to second arming terminals of the gates G10 and G11. Thus, the pulse from the transducer 238 is applied through the gate G10 to the M*n* input of the circuit SR thereby placing the circuit SR in its M*n* condition. If, at the end of the first word interval the dual reciprocircuit of the register M*a* is in its naught condition, a potential is applied from the naught output of the register M*a* through a lead 416 to a first arming terminal of the gate G11. In this case, the pulse from the transducer 238 is conducted through the gate G11 to the M*n* input of the circuit SR thereby placing the circuit SR in its M*p* condition.

At the end of the first word time, the subtractor in the register M*d* has been subtracted from the radicand or remainder in the register M*a*. If the subtractor is less than the radicand or remainder, a naught is obtained in the extended order of the register M*a* and thus the dual reciprocircuit of the register M*a* remains in its naught condition at the end of the first word time. However, if the subtractor in the register M*d* is greater than the remainder in the register M*a*, the extended order of the register M*a* is a unit so that at the end of the first word time, the dual reciprocircuit of the register M*a* remains in its unit condition.

At the end of the first word time, the circuit SR is either in its M*p* or M*n* condition corresponding to the naught or unit condition of the dual reciprocircuit of the register M*a* at the end of the first word interval. The selector bistable reciprocircuit SR therefore indicates which operation is to be followed during a second word time in accordance with the rules for deriving a binary square root.

*Second word time*

In accordance with the rules for extracting a binary square root, the additive subtractor modifier in the register M*p* is added to the subtractor of the register M*d* if the circuit SR is placed in its M$p$ condition during the first word time. If SR is set to its M$n$ condition during the first word time, the true complement of the subtractive subtractor modifier in the register M$n$ is added to the subtractor in the register M$d$. Concurrent with one or the other additions, all digits in the registers M$d$, M$n$, and M$p$ are shifted appropriately, according to the rules. In addition, and concurrently, if the dual reciprocircuit of the register M$a$ remains in its unit condition at the end of the first word time, the subtractor in the register M$d$ is added to the remainder in the register M$a$ during the second word interval.

To accomplish these operations, the following conditions are set up during the control interval preceding the second word interval. A positive potential is applied through the commutator C6 (the brush 430, the ring 424, the segment 425, and the brush 422) and the lead 411 to the first arming terminals of the gates G7, G9, and G4. This partially arms these gates. A positive potential applied through the non-shifting transducers 85 of the registers M$d$, M$p$, and M$n$ to the respective dual reciprocircuits, is disconnected by the commutator C5. The commutator C4 (the brush 153, the ring 197, the segment 198, and the brush 152) connects a positive potential through shifting heads 83 to the reciprocircuits of the registers M$d$, M$p$ and M$n$ respectively.

Assume that the dual reciprocircuit of the register M$a$ is in its naught condition, at the end of the first word interval. Thus, the circuit SR is in its M$p$ condition. Under these conditions, two operations occur concurrently during the second word interval. First, the additive subtractor modifier in the register M$p$ is added to the subtractor in the register M$d$. Second, the numbers in each of the registers M$d$, M$p$ and M$n$ are appropriately shifted.

The gate G7 is fully armed by a potential applied to a first arming terminal from the M$p$ output of the circuit SR and by a positive potential applied through the commutator C6 to a second arming terminal. A unit pulse generated in the transducer 80$p$ is conducted through the gate G7 to the terminal 620 of the adder circuit A$d$. A naught pulse generated in the transducer 80$p$ is conducted only to the naught input of the register M$p$. Therefore, the absence of a pulse at the terminal 620 during a digit interval indicates a naught.

Thus, the representations of the pulses applied to the terminals 600 and 601, and to the terminal 620 from the registers M$d$ and M$p$ respectively, are added together in the circuit A$d$, as described in the description of circuit elements, so that a sum representation appears at either the terminal 608 or 609. A pulse emerging at the terminal 608 indicates a unit sum. A pulse appearing at the terminal 609 indicates a naught sum. Any carries are stored in the adder circuit A$d$.

A second set of operations occurs during the second word interval, if at the end of the first word time, the dual reciprocircuit of the register M$a$ is placed in its unit condition. In this case, the circuit SR is placed in its M$n$ condition, the gate G9 is partially armed through the commutator C6, as is the gate G4. A potential is applied to the respective dual reciprocircuits through the commutator C4 and shifting writing transducers 83 of the respective registers M$d$, M$p$ and M$n$. With the circuit SR in its M$n$ condition, the gates G9 and G4 are fully armed by a potential from the M$n$ output of the circuit SR. A unit pulse generated in the transducer 80$n$ is conducted through the gate G9 and applied to the terminal 620 of the circuit A$d$. Thus, as in the case with the register M$p$, the subtractive subtractor modifier in the register M$n$ is added to the subtractor in the register M$d$. At the same time, the gate G4 is fully armed by a potential from the M$n$ output of the circuit SR through the lead 412 connected to a second arming terminal of the gate G4. A unit pulse is generated in the transducer 80$d$ and is conducted through the amplifier A3, the lead 410, and the gate G4 to the terminal 720 of the adder circuit AS. Since the circuit SR is in its M$n$ condition, a potential from the M$n$ output of the circuit SR is applied through the lead 412 to the adder terminal 806 of the circuit AS. Thus, the pulse representations of the number contained in the register M$a$ are applied to the terminals 700 and 701. Subtractor representations contained in the register M$d$ are applied to the terminal 720. The representation of the sum of these two numbers appears at the terminals 708 and 709 and are then entered into the register M$a$.

During the first digit interval of the control interval following the second word time a pulse is generated in the transducer 238. This pulse is applied to the terminal 714 of the adder-subtractor circuit AS. Therefore, the circuit AS is placed in its naught condition. A unit carry from the previous addition is canceled if present.

The pulse from the transducer 238 is applied also to the input of the gate G14. The gate G14 is armed during the second word time by a positive potential applied through the commutator C5 to an arming terminal of the gate G14. Therefore, the gate G14 passes the control pulse to the M$p$ input of the circuit SR, thereby setting the circuit SR to its M$p$ condition.

A potential from the M$p$ output of the circuit SR is applied through the lead 413 to the subtract terminal 805 of the adder-subtractor circuit AS. Thus, the adder-subtractor circuit AS is in its subtract condition so that the word in the register M$d$ is subtracted from the word in the register M$a$ during the first word interval of the next routine cycle.

At the end of a square root extraction, i.e., the repetition of a number of routine cycles corresponding to the capacity of the registers, the root is contained in the subtractor register M$d$.

The invention claimed is:

1. Apparatus for extracting the square root of a binary number comprising: a radicand register, means for entering a binary digital representation of a radicand into said radicand register; a subtractor register, means for entering into said subtractor register a binary digital representation of a subtractor defined by the formula $S_0=1(2)^{2x-2}$ where $x$ is equal to one-half the number of orders of a radicand having an even total number of orders and equal to one-half the number of orders plus one of a radicand having an odd total number of orders; an additive subtractor modifier register, means for entering into said additive subtractor modifier register a binary digital representation of an additive subtractor modifier defined by the formula $M_{as}=11(2)^{2x-3}$; a subtractive subtractor modifier register, means for entering into said subtractive subtractor modifier register the true complement of a binary digital representation of a subtractive subtractor modifier defined by the formula $M_{ss}=1(2)^{2x-3}$; means for executing a cycle of numeration including subtracting the representation in said subtractor register from the representation in said radicand register to obtain a binary digital difference representation in said radicand register; means for detecting and indicating the sign of said difference representation; a root register, means for entering one order of the root into said root register in correspondence with said difference representation; means for adding the representation in said subtractive subtractor modifier register to the representation in said subtractor register upon the detection of a negative difference representation; means for adding the representation in the subtractor register to the representation in the radicand register upon the detection of a negative difference representation; means for adding the representation in said additive subtractor modifier register to the representation in said subtractor register upon the detection of a positive difference representation; means for shifting the representation in said subtractor register one binary place to the right; means for shifting the representation in said additive subtractor modifier register two binary places to the right; means for shifting the representation in said subtractive subtractor modifier register two binary places to the right; means for shifting the root representation in the root register one binary place to the left; and means for repeating a number of numeration cycles equal to the value of $x$.

2. Cyclically operable apparatus for extracting the square root of a binary number comprising: a first register; means for entering a binary radicand into said first register; a second register; means for entering a subtractor corresponding to said radicand into said second register; a third register; means for entering an additive subtractor modifier corresponding to said radicand into said third register; a fourth register; means for entering a subtractive subtractor modifier corresponding to said radicand into said fourth register; means for subtracting said subtractor from said radicand and for entering the difference into said first register during a first word interval of a numeration cycle said cycle comprising three word times; means for detecting the condition of said first register at the end of said first word interval; means for adding the subtractor to said difference during a second word interval upon the detection of a first condition of said first register; means for subtracting the subtractive subtractor modifier from said subtractor during a third word interval upon the detection of the first condition of said first register; means for adding the additive subtractor modifier to said subtractor during the third word interval upon the detection of a second condition of said first register; and means for driving said apparatus through a number of numeration cycles, said number of cycles having a predetermined relationship to the number of orders of said radicand.

3. In a calculator, the combination of: a first register; means for entering a binary radicand into said first register; a second register; means for entering a subtractor corresponding to said radicand into said second register; a third register; means for entering an additive subtractor modifier corresponding to said radicand into said third register; a fourth register; means for entering the true complement of a subtractive subtractor modifier corresponding to said radicand into said fourth register; means for subtracting said subtractor from said radicand and for recording the difference; means for detecting the sign of said difference; means for modifying said subtractor comprising means for adding said additive subtractor modifier to said subtractor upon the detection of a positive difference and means for adding the complement of said subtractive subtractor modifier to said subtractor upon the detection of a negative difference; and means for successively subtracting the modified subtractor from each successive difference and for modifying the subtractor after each successive subtraction for a number of cycles uniquely related to the number of orders of said radicand.

4. Cyclically operable apparatus for extracting the square root of a binary number comprising: a first register; means for entering a binary radicand into said first register; a second register; means for entering a subtractor corresponding to said radicand into said second register; a third register; means for entering an additive subtractor modifier corresponding to said radicand into said third register; a fourth register; means for entering a subtractive subtractor modifier corresponding to said radicand into said fourth register; means for subtracting said subtractor from said radicand and for entering the difference into said first register during a first word interval of a numeration cycle, said cycle comprising two word times; means for detecting the condition of said first register during the first word time; means for adding said additive subtractive subtractor modifier to said subtractor during the second word interval upon the detection of a first predetermined condition of said first register; means for adding said subtractor to said difference and entering the sum into said first register during the second word interval upon the detection of a second predetermined condition of said first register; means for subtracting said subtractive subtractor modifier from said subtractor during the second word interval upon the detection of the second predetermined condition of said first register; means for shifting the contents of said second register one binary place to the right during the second word time; means for shifting the contents of the third and fourth registers two binary places to the right during the second word time; and means for driving said apparatus through a number of numeration cycles, said number of cycles having a predetermined relationship to the number of orders of said radicand.

5. Apparatus for extracting the square root of a binary number comprising: a first register; means for entering a radicand representation into said first register; a second register; means for entering a subtractor representation corresponding to said radicand into said second register; a subtractive gate; means coupling an output of said second register to the input of said subtractive gate; a subtractive carry gate; means coupling the output of said subtractive gate to an input of said first register and to the input of said subtractive carry gate; a carry circuit; means coupling the output of said subtractive carry gate to an input of said carry circuit; means coupling the output of said carry circuit to an input of said first register and to the input of said subtractive carry gate; first and second detection gates; a reset gate; a control pulse source; means coupling the output of said control pulse source to an input of said carry circuit, the inputs of said detection gates, and the input of said reset gate; a first arming potential connection from said first register to an arming terminal of said first detection gate; a second arming potential connection from said first register to a first arming terminal of said second detection gate; a root reciprocircuit; a selector reciprocircuit; means coupling the output of said second detection gate and the output of said reset gate to respective inputs of said root reciprocircuit; means coupling the output of said first and second detection gates to respective inputs of said selector reciprocircuit; means for providing an arming potential during a first word time to the subtractive gate, the subtractive carry gate, the first and second detection gates, and the reset gate; a first additive gate; an additive carry gate; means coupling an output of said second register to the input of said first additive gate; means coupling the output of said first additive gate to an input of said first register and to the input of said additive carry gate; means coupling the output of said additive carry gate to an input of said carry circuit; an arming potential connection from said first register to an arming terminal of said additive carry gate; means coupling an output potential of said selector reciprocircuit to an arming terminal of said first additive gate; means for providing an arming potential during a second word time to said first additive gate and to said additive carry gate; a third register; means for entering an additive subtractor modifier representation corresponding to said radicand into said third register; a fourth register; means for entering a subtractive modifier representation corresponding to said radicand into said fourth register; a fifth register; means for entering a naught representation into all orders of said fifth register; first and second selective add gates; a second additive gate; means coupling the output of said third register to the input of said first selective add gate; means coupling the output of said fourth register to the input of said second selective add gate; means coupling the output of said first and second selective add gates to the input of said second register and to the input of said second additive gate; means coupling the output of said carry circuit to an input of said second register and the input of said second additive gate; first and second root gates; means coupling the output of said root gates to the input of said fifth register; a connection from the first output of said selector reciprocircuit to an arming terminal of said selective add gate; a connection from the second output of said selector reciprocircuit to an arming terminal of said second selective add gate; a connection from a first output of said second register to an arming terminal of said second additive gate; a connection from a first output of said root reciprocircuit to an arming terminal of said first root gate; a connection from a second output of said root reciprocircuit to an arming terminal of said second root gate; and means for providing an arming potential during a third word time to said first and second root gates and to said first and second selective add gates.

6. Apparatus for extracting the square root of a binary number comprising: a first register; means for entering a radicand into said first register; a second register; means for entering a subtractor corresponding to said radicand into said second register; a third register; means for entering an additive subtractor modifier corresponding to said radicand into said third register; a fourth register; means for entering a subtractive subtractor modifier corresponding to said radicand into said fourth register; means for subtracting said subtractor from said radicand and entering the difference into said first register during a first word interval; means for detecting a predetermined condition of said first register at the end of said first word interval; means for normally adding the additive subtractor modifier to said subtractor and for entering the sum into said second register during a second word interval; means for adding the subtractor to said difference upon the detection of said predetermined condition of said first register and for entering the sum into the first register during the second word interval; means for subtracting the subtractive subtractor modifier from the subtractor and entering the difference into said second register during the second word interval upon the detection of said predetermined condition of said first register; and means for shifting the contents of said second register one binary place to the right and for shifting the contents of said third and fourth registers two binary places to the right during said second word interval.

7. Apparatus for extracting the square root of a binary number comprising: a radicand register, means for entering a binary digital representation of a radicand into said radicand register; a subtractor register, means for entering into said subtractor register a binary digital representation of a subtractor defined by the formula $S_0=1(2)^{2x-2}$ where $x$ is equal to one-half the number of orders of a radicand having an even total number of orders and equal to one-half the number of orders plus one of a radicand having an odd total number of orders; an additive subtractor modifier register, means for entering into said additive subtractor modifier register a binary digital representation of an additive subtractor modifier defined by the formula $M_{as}=11(2)^{2x-3}$; a subtractive subtractor modifier register, means for entering into said subtractive subtractor modifier register a binary digital representation of a subtractive subtractor modifier defined by the formula $M_{ss}=1(2)^{2x-3}$; means for executing a cycle of numeration including subtracting the representation in said subtractor register from the representation in said radicand register to obtain a binary digital difference representation in said radicand register; means for detecting the sign of said difference representation; means for subtracting the representation in said subtractive subtractor modifier register from the representation in said subtractor register upon the detection of a negative difference representation; means for adding the representation in said additive subtractor modifier register to the representation in said subtractor register upon the detection of a positive difference representation; means for adding the representation in the subtractor register to the representation in the radicand register upon the detection of a negative difference representation; means for shifting the representation in said subtractor register one binary place to the right; means for shifting the representation in said additive subtractor modifier register two places to the right; means for shifting the representation in said subtractive subtractor modifier register two places to the right; and means for repeating a number of numeration cycles equal to the value of $x$.

8. In a calculator, the combination of: a subtractor register; a subtract gate; means connecting an output of said subtractor register to the input of said subtract gate; an adder-subtractor circuit; means connecting an output of said subtract gate to an input of said adder-subtractor circuit; a radicand register; means connecting an output of said radicand register to an input of said adder-subtractor circuit; first and second detection gates; a control pulse source; means connecting the output of said control pulse source to a reset terminal of said adder-subtractor circuit, the input of said first detection gate, and the input of said second detection gate; a selector reciprocircuit; means connecting the output of said first detection gate to a first input of said selector reciprocircuit; means connecting the output of said second detection gate to a second input of said selector reciprocircuit; means connecting a first arming potential terminal of said radicand register to a first arming terminal of said first detection gate; means connecting a second arming potential terminal of said radicand register to a first arming terminal of said second detection gate; means connecting a first output of said selector reciprocircuit to a subtract terminal of said adder-subtractor circuit; means providing an arming potential during a first word time to second arming terminals of said first and second detection gates; means for providing an arming potential during a first word time to an arming terminal of said subtract gate; an add gate; means connecting the output of said subtractor register to the input of said add gate; means connecting the output of said add gate to an input of said adder-subtractor circuit; means connecting a first arming potential terminal of said selector reciprocircuit to a first arming terminal of said add gate; an additive subtractor modifier register; first and second selective add gates; means connecting an output of said additive subtractor modifier register to the input of said first selective add gate; a subtractive subtractor modifier register; means connecting an output of said subtractive subtractor modifier register to the input of said second selective add gate; means connecting the first arming potential terminal of said selector reciprocircuit to a first arming terminal of said second selective add gate; means connecting a second arming potential terminal of said selector reciprocircuit to a first arming terminal of said first selective add gate; an adder circuit; means connecting the outputs of said first and second selective add gates to an input of said adder circuit; means connecting an output of said subtractor register to an input of said adder circuit; means connecting the output of said adder circuit to an input of said subtractor register; a reset gate; means connecting the output of said pulse source to the input of said reset gate; means connecting the output of said reset gate to a reset input of said selector reciprocircuit; means for arming said reset gate during a second word time; and means for applying an arming potential to second arming terminals of said add and said first and second selective add gates during said second word time.

No references cited.